(12) United States Patent
Seo et al.

(10) Patent No.: US 10,638,484 B2
(45) Date of Patent: Apr. 28, 2020

(54) METHOD FOR TRANSMITTING OR RECEIVING DOWNLINK CONTROL INFORMATION IN WIRELESS COMMUNICATION SYSTEM AND DEVICE THEREFOR

(71) Applicant: LG ELECTRONICS INC., Seoul (KR)

(72) Inventors: Inkwon Seo, Seoul (KR); Kijun Kim, Seoul (KR); Yunjung Yi, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/318,119

(22) PCT Filed: Jul. 21, 2017

(86) PCT No.: PCT/KR2017/007869
§ 371 (c)(1),
(2) Date: Jan. 15, 2019

(87) PCT Pub. No.: WO2018/016907
PCT Pub. Date: Jan. 25, 2018

(65) Prior Publication Data
US 2019/0306847 A1    Oct. 3, 2019

Related U.S. Application Data

(60) Provisional application No. 62/520,579, filed on Jun. 16, 2017, provisional application No. 62/364,884, filed on Jul. 21, 2016.

(51) Int. Cl.
*H04B 7/02* (2018.01)
*H04W 72/04* (2009.01)
(Continued)

(52) U.S. Cl.
CPC ........ *H04W 72/046* (2013.01); *H04B 7/0417* (2013.01); *H04L 5/00* (2013.01);
(Continued)

(58) Field of Classification Search
CPC ............. H04W 72/046; H04W 72/042; H04B 7/0417; H04L 25/022; H04L 25/0224; H04L 27/2676
(Continued)

(56) References Cited

U.S. PATENT DOCUMENTS

2013/0223251 A1* 8/2013 Li .................. H04W 72/046
370/252
2013/0286960 A1* 10/2013 Li .................. H04W 72/042
370/329
(Continued)

FOREIGN PATENT DOCUMENTS

| KR | 1020130052670 | 5/2013 |
|---|---|---|
| KR | 1020140081754 | 7/2014 |
| WO | 2018/169318 | 9/2018 |

OTHER PUBLICATIONS

PCT International Application No. PCT/KR2017/007869, Written Opinion of the International Searching Authority dated Oct. 26, 2017, 21 pages.
(Continued)

*Primary Examiner* — Don N Vo
(74) *Attorney, Agent, or Firm* — Lee Hong Degerman Kang & Waimey

(57) ABSTRACT

According to one embodiment of the present invention, at least two transmission-reception beam pairs for control information between a terminal and a base station are set, and the terminal performs a blind detection for the control information by using the at least two transmission-reception
(Continued)

beam pairs, thereby enabling the control information to be more strongly and efficiently transmitted and received.

10 Claims, 12 Drawing Sheets

(51) Int. Cl.
  *H04B 7/0417* (2017.01)
  *H04L 25/02* (2006.01)
  *H04L 27/26* (2006.01)
  *H04L 5/00* (2006.01)
(52) U.S. Cl.
  CPC ........ *H04L 25/022* (2013.01); *H04L 25/0224* (2013.01); *H04L 27/2676* (2013.01); *H04W 72/042* (2013.01)
(58) Field of Classification Search
  USPC ........................................................ 375/267
  See application file for complete search history.

(56) References Cited

U.S. PATENT DOCUMENTS

| | | |
|---|---|---|
| 2014/0177561 A1 | 6/2014 | Yu et al. |
| 2016/0037498 A1 | 2/2016 | Chen et al. |
| 2017/0034812 A1* | 2/2017 | Deng .................. H04W 72/046 |
| 2017/0311301 A1* | 10/2017 | Yu ........................ H04B 7/0617 |
| 2019/0190747 A1* | 6/2019 | Park ........................ H04L 5/005 |

OTHER PUBLICATIONS

Interdigital Communications, "Beam-based design framework for New Radio", 3GPP TSG RAN WG1 Meeting #85, R1-164874, May 2016, 4 pages.
Intel, "On UE side beamforming", 3GPP TSG RAN WG1 Meeting #85, R1-164189, May 2016, 4 pages.
European patent application No. 17831379.7, European search report dated Jan. 29, 2020, 9 pages.
LG Electronics, "Discussion on DL beam management," 3GPP TSG RAN WG1 Meeting #88bis, R1-1704877, Spokane, USA, Apr. 3-7, 2016, 6 pages.

* cited by examiner

METHOD FOR TRANSMITTING OR RECEIVING DOWNLINK CONTROL INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/007869, filed on Jul. 21, 2017, which claims the benefit of U.S. Provisional Application No. 62/364,884, filed on Jul. 21, 2016, and 62/520,579, filed on Jun. 16, 2017, the contents of which are all hereby incorporated by reference herein in their entirety.

TECHNICAL FIELD

The present invention relates to a wireless communication system, and more particularly, to methods of transmitting and receiving downlink control information through transmission/reception beams and devices therefor.

BACKGROUND ART

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/UE susceptible to latency and reliability, URLLC (Ultra-Reliable and Low Latency Communication) has been discussed in a next generation communication system.

As described above, a new RAT considering eMBB, mMTC and URLCC has been discussed for next generation wireless communication.

DISCLOSURE OF THE INVENTION

Technical Task

The object of the present invention is to provide methods of transmitting and receiving control information more robustly and efficiently in an environment where beamforming is applied to the control information.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, provided is a method of receiving downlink control information by a User Equipment (UE) in a wireless communication system. The method may include: receiving, from a Base Station (BS), beam association information between Reception (Rx) beams of the UE and Transmission (Tx) beams of the BS; and attempting blind detection of a physical downlink control channel carrying the downlink control information based on the beam association information. The beam association information may indicate at least two beam pairs where the Rx beams of the UE and the Tx beams of the BS are associated with each other, and the UE may configure an Rx beam to be used for the blind detection of the physical downlink control channel according to the at least two beam pairs indicated by the beam association information.

In another aspect of the present invention, provided is a User Equipment (UE) for receiving downlink control information in a wireless communication system. The UE may include: a receiver; and a processor configured to receive, from a Base Station (BS), beam association information between Reception (Rx) beams of the UE and Transmission (Tx) beams of the BS by controlling the receiver and attempt blind detection of a physical downlink control channel carrying the downlink control information based on the beam association information. The beam association information may indicate at least two beam pairs where the Rx beams of the UE and the Tx beams of the BS are associated with each other, and the processor may be configured to configure an Rx beam to be used for the blind detection of the physical downlink control channel according to the at least two beam pairs indicated by the beam association information.

In a further aspect of the present invention, provided is a method of transmitting downlink control information by a Base Station (BS) in a wireless communication system. The method may include: transmitting, to a User Equipment (UE), beam association information between Reception (Rx) beams of the UE and Transmission (Tx) beams of the BS; and transmitting a physical downlink control channel carrying the downlink control information based on the beam association information. The beam association information may indicate at least two beam pairs where the Rx beams of the UE and the Tx beams of the BS are associated with each other, and an Rx beam to be used for blind detection of the physical downlink control channel may be configured according to the at least two beam pairs indicated by the beam association information.

In a still further aspect of the present invention, provided is a Base Station (BS) for transmitting downlink control information in a wireless communication system. The BS may include: a transmitter; and a processor configured to transmit, to a User Equipment (UE), beam association information between Reception (Rx) beams of the UE and Transmission (Tx) beams of the BS by controlling the transmitter and transmit a physical downlink control channel carrying the downlink control information based on the beam association information. The beam association information may indicate at least two beam pairs where the Rx beams of the UE and the Tx beams of the BS are associated with each other, and an Rx beam to be used for blind detection of the physical downlink control channel may be configured according to the at least two beam pairs indicated by the beam association information.

The beam association information may include a beam index of only one of Tx and Rx beams belonging to each beam pair or include beam indices of both the Tx and Rx beams.

The at least two beam pairs may be configured in different symbols within a same subframe, respectively.

The UE may report, to the BS, a result of measuring multiple Tx beams using at least one Rx beam, and the beam association information may be obtained based on a measurement result report of the UE.

The UE may receive, from the BS, information regarding at least one of control resource sets (CORESETs) where the at least two beam pairs are configured respectively and monitoring sets where the UE should monitor the at least two beam pairs respectively.

The UE may apply different Quasi Co-Location (QCL) assumptions to the CORESETs, respectively The UE may assume that the CORESETs are Quasi Co-Located (QCLed) with different Channel State Information-Reference Signals (CSI-RSs), respectively.

The UE may assume that among the CORESETs, a first CORESET for UE-specific control information is QCLed with a CSI-RS and a second CORESET for common control information is QCLed with a synchronization signal block.

The UE may attempt the blind detection of the physical downlink control channel by configuring different Rx beams for the at least two beam pairs.

Advantageous Effects

According to the present invention, at least two Tx-Rx beam pairs for control information may be configured between a UE and a BS, and the UE may perform blind detection for the control information using the at least two Tx-Rx beam pairs, thereby transmitting and receiving the control information more robustly and efficiently.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present invention may be non-limited. Specific terminologies used in the following description are provided to help understand the present invention and the use of the terminologies can be modified to a different form within a scope of the technical idea of the present invention.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
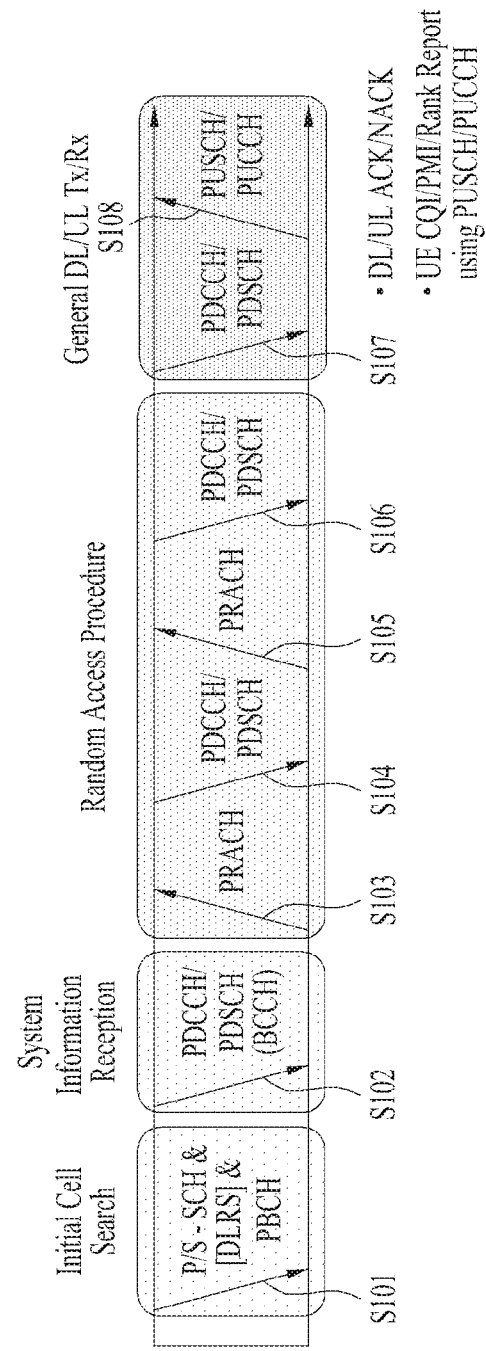
FIG. 1 is a diagram for explaining an example of physical channels used for 3GPP LTE/LTE-A system and a general signal transmission method using the same.

FIG. 1 is a diagram for explaining an example of physical channels used for 3GPP LTE/LTE-A system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random-access procedure to complete the access to the eNB [S103 to S106]. To this end, the user equipment may transmit a preamble via a physical random-access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random-access channel and a channel reception [S106] of a physical downlink control channel and a corresponding physical downlink shared channel.

Having performed the above-mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
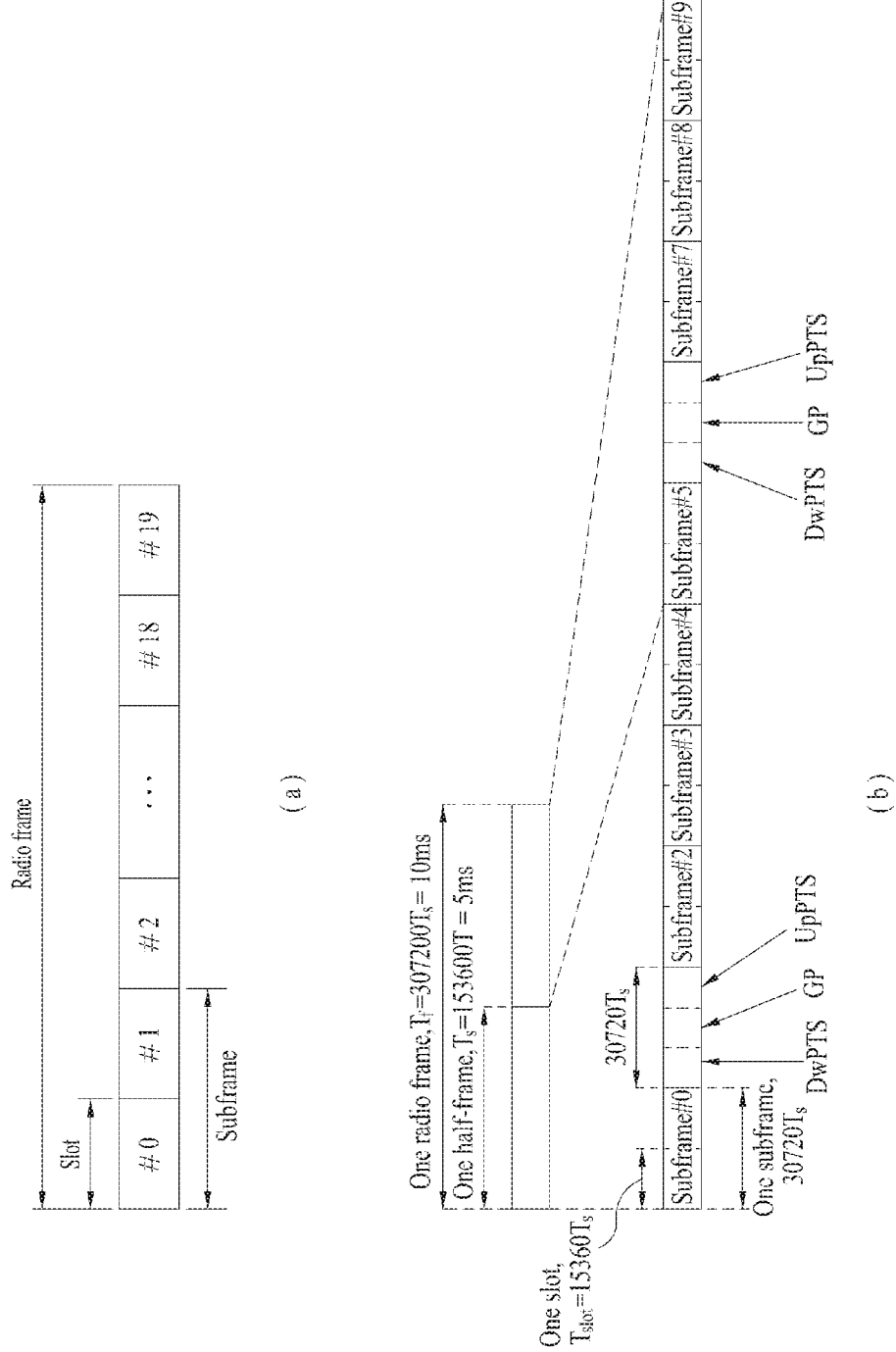
FIG. 2 is a diagram for explaining an example of a structure of a radio frame for 3GPP LTE/LTE-A system.

FIG. 2 is a diagram for explaining an example of a structure of a radio frame. Referring to FIG. 2, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2 (b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a user equipment. The UpPTS is used for channel estimation in an eNB and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
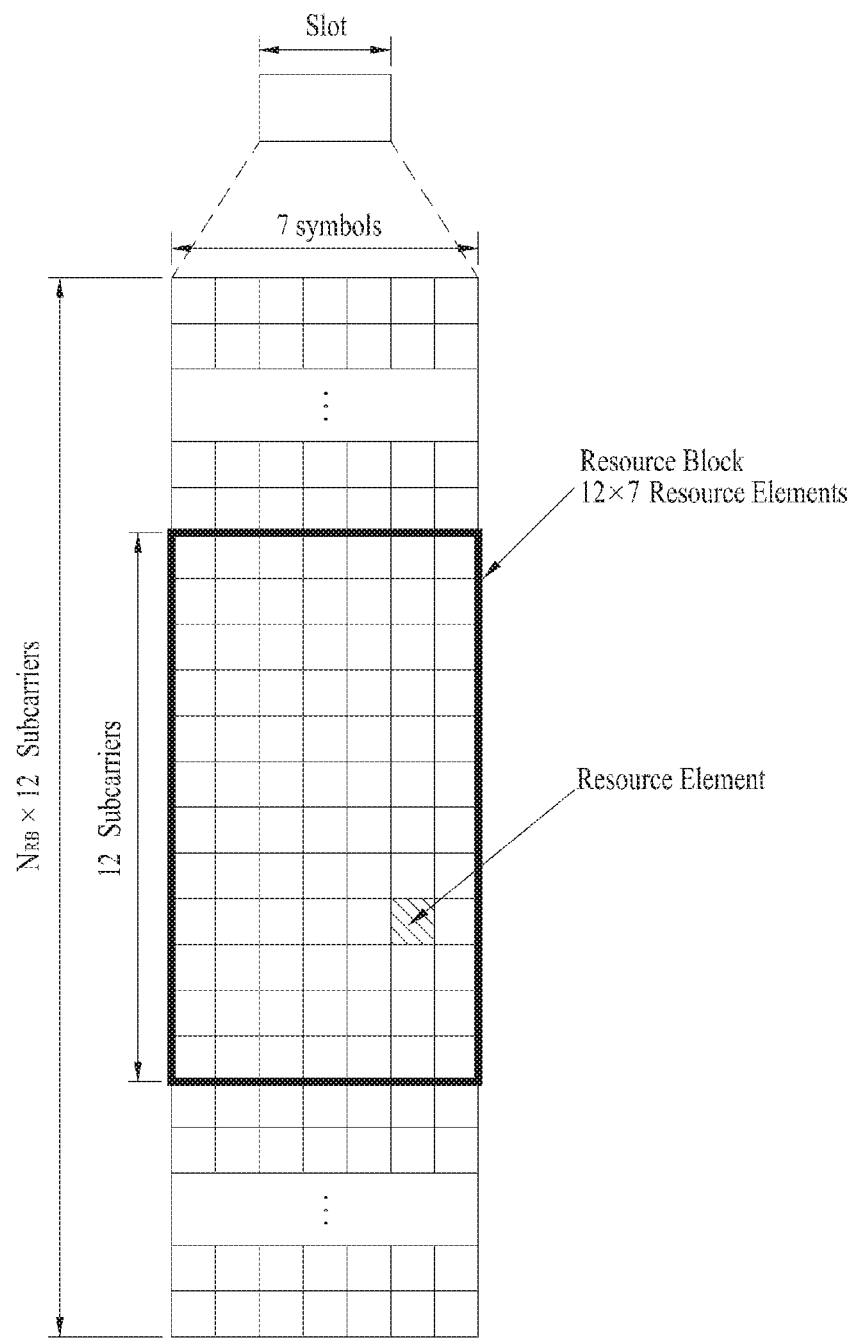
FIG. 3 is a diagram for one example of a resource grid for a downlink slot for 3GPP LTE/LTE-A system.

FIG. 3 is a diagram for one example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number $N_{RB}$ of resource blocks included in a DL slot may depend on a DL transmission bandwidth. And, the structure of an uplink (UL) slot may be identical to that of the DL slot and OFDM symbol is replaced by SC-FDMA symbol.

Figure 4:
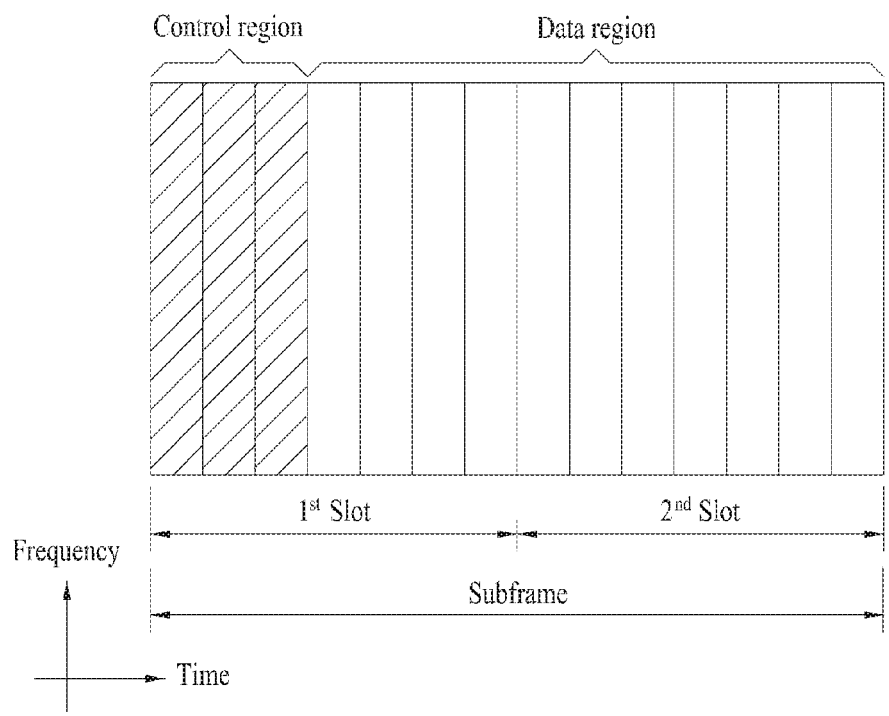
FIG. 4 is a diagram for a structure of a downlink subframe for 3GPP LTE/LTE-A system.

FIG. 4 is a diagram for an example of a structure of a downlink subframe.

Referring to FIG. 4, maximum 3 (4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Figure 5:
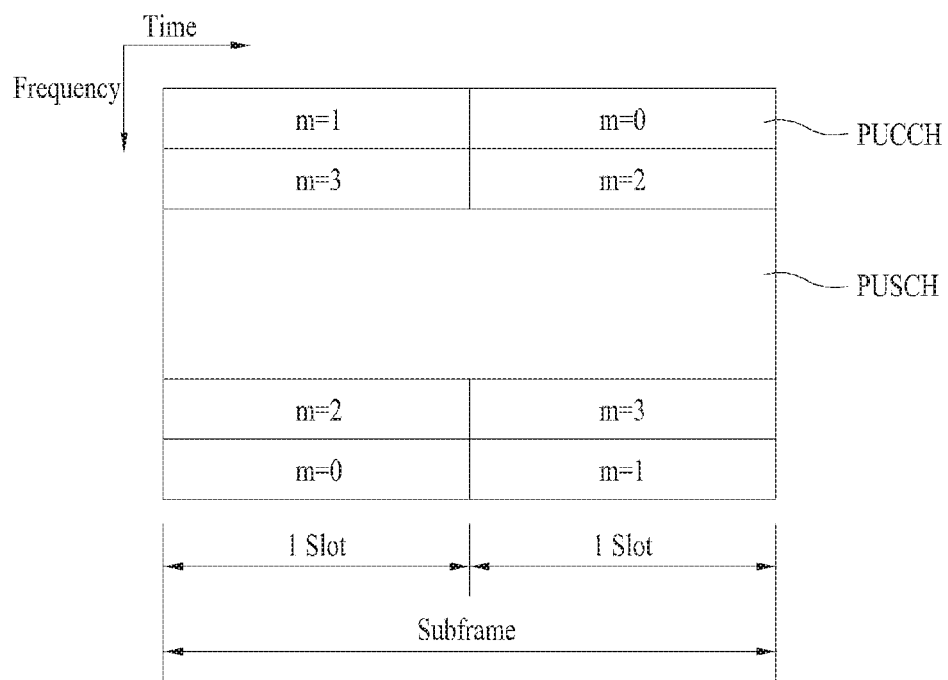
FIG. 5 is a diagram for a structure of an uplink subframe for 3GPP LTE/LTE-A system.

FIG. 5 is a diagram for an example of a structure of an uplink subframe.

Referring to FIG. 5, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes an RB pair situated at the both ends of the data region on a frequency axis and hops on a slot boundary.

The PUCCH can be used for transmitting control information such as SR (Scheduling Request), HARQ-ACK and/or CSI (Channel State Information).

New RAT

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

Self-Contained Subframe

Figure 6:
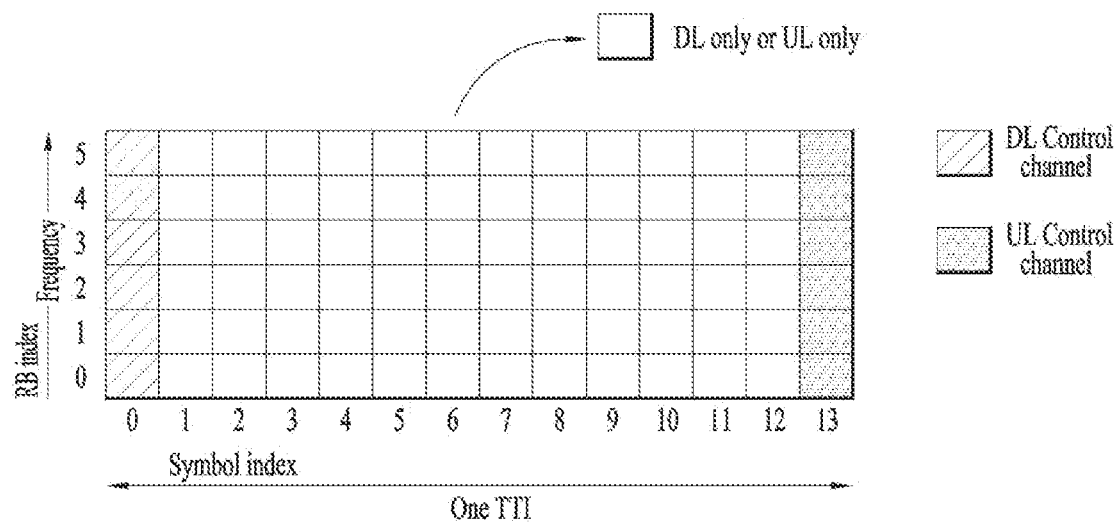
FIG. 6 is a diagram illustrating a structure of a self-contained subframe according to one embodiment of the present invention.

FIG. 6 is a diagram illustrating a structure of a self-contained subframe according to one embodiment of the present invention.

According to a TDD-based self-contained subframe structure, both a resource region for DL and a resource region for UL (e.g., DL and UL control channels) exist in one subframe.

In FIG. 6, oblique line areas indicate downlink control regions and black colored areas indicate uplink control regions. Areas having no mark may be used for downlink data transmission or uplink data transmission.

In this self-contained subframe structure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized.

As described above, the expression "Self-Contained" may cover that a response (ACK/NACK) to DL or UL transmitted within the corresponding subframe is received within the corresponding subframe. However, since the time of one subframe or more may be required for transmission and response in accordance with processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows an eNB and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 6 shows that a subframe is configured in the order of DL control region-data region-UL control region, the present invention is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Figure 7:
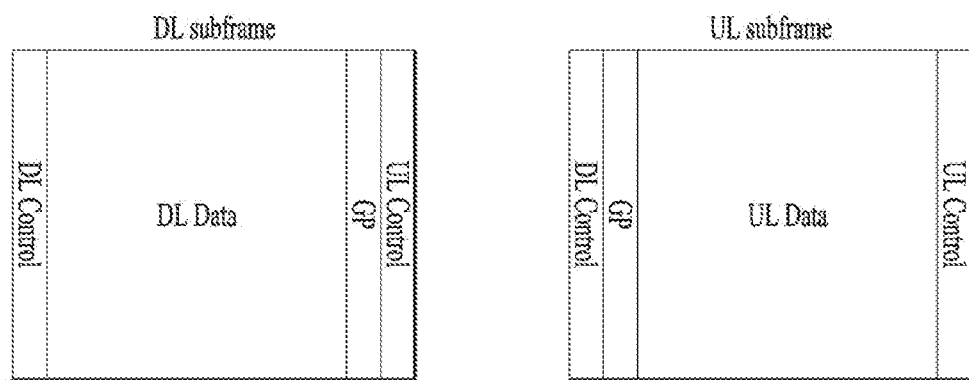
FIG. 7 is a diagram illustrating a downlink self-contained subframe and an uplink self-contained subframe according to one embodiment of the present invention.

FIG. 7 is a diagram illustrating a DL subframe and a UL subframe according to one embodiment of the present invention.

Referring to FIG. 7, the GP is located at the time when DL is switched to UL. For example, the GP is located between the DL data region and the UL control region at the DL subframe and is located between the DL control region and the UL data region at the UL subframe.

The GP may include Tx/Rx switching time of the eNB/UE and a timing advance (TA) for UL transmission of the UE.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ (wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

Multiple Beam Observation for Control Channel Decoding

The New Rat (NR) system has an advantage in that beamforming gain can be obtained due to use of analog beams but has a disadvantage in that an analog beam can be formed only in one direction at each time instance (e.g., symbol, subframe, etc.). Since this restriction is imposed not only to transmission beamforming at a transmitter transmitting signals but also to transmission beamforming at a receiver receiving signals, performance may be degraded if a beam association between Tx and Rx beams is inaccurate.

In addition, even if the Tx-Rx beam association is accurate, there may be problems such as a scheduling issue (for example, a number of UEs may prefer a specific beam), decoding failure due to channel variation, etc. Accordingly, solutions thereto are required.

Figure 8:
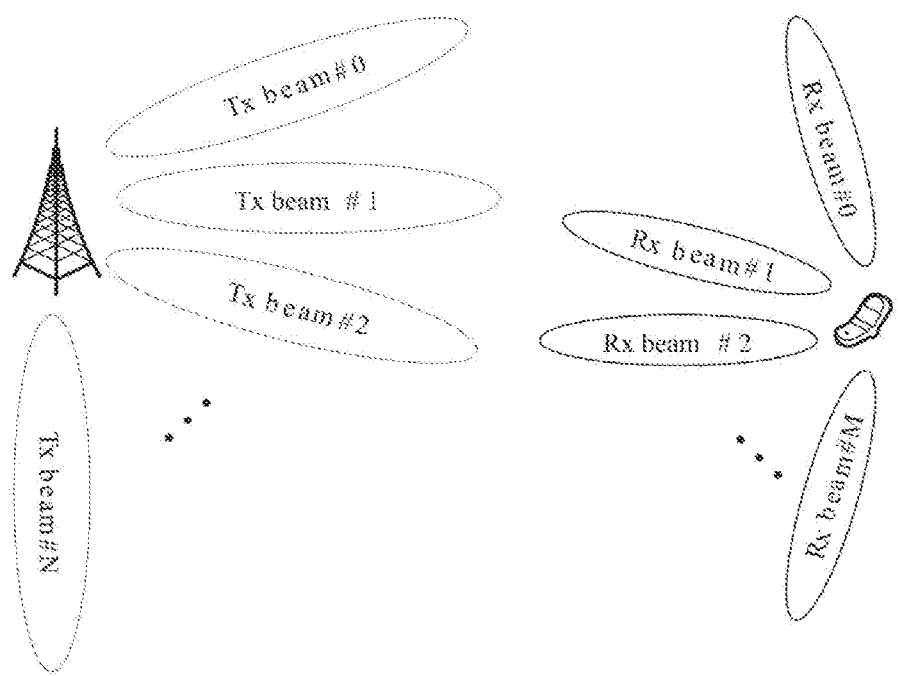
FIG. 8 illustrates an example of configuring Tx-Rx beams between a BS and a UE.

FIG. 8 illustrates an example of configuring Tx-Rx beams between a BS and a UE. In the NR system, a BS can be called a gNodeB (gNB). For convenience of description, it is assumed that the BS can configure N Tx analog beams and the UE can configure M Rx analog beams.

In the Tx-Rx beam configuration shown in FIG. 8, the best reception performance can be achieved when the UE receives a signal carried by Tx beam #1 using Rx beam #1 or receives a signal carried by Tx beam #2 using Rx beam #2. On the other hand, if the signal carried by Tx beam #2 is received using other Rx beams except Rx beam #2, the reception performance may be degraded, or the signal may not be detected.

If the BS and UE measure a Tx-Rx beam combination (e.g., best Tx-Rx beam) with the best reception performance and use only the Tx-Rx beam combination in performing transmission and reception, it is difficult to cope with changes in the best beam due to channel variation. And, if transmission and reception loads are concentrated on the best beam, radio resources to be allocated per UE may become insufficient. In addition, since there may occur processing delay similar to the conventional handover if beam switching is performed due to the channel variation, a method for reducing the number of rounds of beam switching or a method for simplifying a beam switching process is required.

To solve the above-described problems, the present invention proposes a method in which a UE performs blind decoding for multiple Tx beams or multiple Tx-Rx beam combinations when attempting to decode a control channel. If a UE is configured to monitor multiple Tx beams or multiple Tx-Rx beams, control channel transmission is not necessarily limited to the best beam. Thus, the method has an advantage in that transmission and reception operation is more flexible in terms of the best beam change or beam switching.

Meanwhile, the embodiments of the present invention, which will be described later, can be applied to the following Tx-Rx beam cases, but the present invention is not limited thereto. In the following description, QCL could be interpreted as information used by a UE to configure an Rx beam. In the NR, QCL can be called spatial QCL, and the spatial QCL means information used to configure an Rx beam for a specific resource. For example, if a specific control resource set (CORESET) and synchronization signal block #0 are in the (spatial) QCL relationship, a UE may receive resources in the corresponding CORESET using an Rx beam the UE uses when receiving synchronization signal block #0.

(i) A case in which Tx-Rx beams suitable for a specific UE are Quasi Co-Located (QCLed) with one synchronization signal block or coverage of each Tx-Rx beam is included in coverage of one synchronization signal block: A synchronization signal block means a block of a beam(s) carrying a synchronization signal and may include at least one analog beam. If a BS has multiple panels (or RF chains) for analog beamforming, multiple analog beams may be simultaneously formed, and the simultaneously formed multiple analog beams may be included in one synchronization signal block. For example, analog beams #0 to #2 are included in the first synchronization signal block, SS beam #0. Analog beams #0 to #2 may carry the same synchronization signal at the same time. A UE may assume that one synchronization signal block is formed by Single Frequency Network (SFN) transmission via multiple Tx beams. If the UE succeeds in detecting SS beam #0, the UE can regard analog beams #0 to #2 as Tx beams suitable for the corresponding UE. In addition, the UE may assume that antenna ports corresponding to analog beams #0 to #2 are QCLed. Alternatively, if the UE mainly receives a signal carried by analog beam #1 although the BS transmits analog beams #0 to #2, the UE may assume that although the synchronization signal block is QCLed with SS beam #0, a CORESET (e.g., CORESET for an USS) is QCLed with analog beam #1 (by a beam management process, which is performed after synchronization). That is, when receiving the corresponding CORESET, the UE may use an Rx beam used when receiving QCLed analog beam #0 (or CSI-RS port #0).

In other words, an Rx beam for a synchronization signal block may be different from an Rx beam included in the synchronization signal block. In this case, the UE may set an Rx beam for receiving a PBCH included in the synchronization signal block to be equal to an Rx beam used in receiving a PSS/SSS (e.g., SS beam #0), which is in the QCL relationship. If the UE select analog beams #0 (which corresponds to an analog beam at CSI-RS port #0) in the beam management process, the UE may receive an NR-PDCCH by assuming QCL with analog beam #0 in subsequent NR-PDCCH transmission.

Meanwhile, a Common Search Space (CSS) for a control channel may be configured in a synchronization signal block, and a User-specific Search Space (USS) for a control channel may be configured in each analog beam. In addition, it can be assumed that in the CSS, reception operation is performed using an Rx beam used to receive a synchronization signal and in the USS, reception operation is performed using an Rx beam used to receive an analog beam selected in the beam management process (additionally, in the case of a USS transmitted via common signaling (e.g., CCE-to-REG mapping), it may be located in the same CORESET together with a CSS). In this case, the BS may change a Tx-Rx beam where the USS is configured to another one without changing or reconfiguring the CSS.

(ii) A case in which multiple Tx-Rx beams are associated with one Transmission/Reception Point (TRP) or cell ID: The NR can support the Coordinated Multi-Point (CoMP) operation. A UE may assume that at least one PDSCH or PUSCH is not scheduled in the same resource/TTI in one cell. DCI may be transmitted via multiple beam pairs, and it could be interpreted to mean that the DCI is repeated. That is, a BS may repeatedly transmit the same information using different Tx beams, and the repeated transmission may be used as means of preventing blockage of an ultrahigh frequency signal.

(iii) A case in which multiple Tx-Rx beams are associated with multiple TRPs or cell IDs: Such a configuration is possible when a UE can simultaneously process multiple pieces of DCI. In the same resource/TTI, a maximum of one PDSCH/PUSCH may be scheduled per cell ID or TRP.

(iv) For more flexible scheduling, information on UE's PDSCH/PUSCH processing capability may be shared with multiple TRPs or beam pairs. In this case, UE's PDCCH handling capability may be reported/shared separately from UE's PDSCH/PUSCH handling capability. For example, a network may configure multiple Tx-Rx beam pairs for a UE reporting that it has capability of handling multiple PDCCHs. When a UE reports its capability, the UE may inform the network that it can decode and process multiple PDCCHs. In this case, PDCCH handling capability and PDSCH/PUSCH handing capability are separately reported and may be shared on the network.

(v) Multiple Tx-Rx beams may be configured for different bandwidth parts (BWPs). For example, multiple BWPs may exist in the same carrier, and one BWP may mean a unit of bandwidth that can be monitored or processed by a UE. When multiple Tx-Rx beams are configured in one NR carrier or UE carrier, a UE may use capability of monitoring multiple PDCCHs. The multiple-PDCCH monitoring capability may be implemented for various purposes, and the maximum PDCCH decoding number supported by the UE may be reported as UE's capability. For example, the UE's capability may mean the maximum number of control channel candidates that can be simultaneously decoded or the maximum number of Rx beams that can be decoded at the same time. For example, the maximum PDCCH decoding number supported/reported by the UE may be one of 2, 3, and 4. This may indicate capability for UE-specific DL scheduling/UL grants the UE can handle at the same time, and it may be reported/configured separately from DCI decoding capability for a UE-common control channel UE's decoding capability for DCI scheduling UE-common data may be used for USS decoding, but it may not be reported as USS capability.

<Tx-Rx Beam Association>

Herein, a beam association can be referred to as a Tx-Rx beam pair, a Tx-Rx beam index combination, a best (Tx-Rx) beam, a Beam Pair Link (BPL), or the like. As a method for indicating the beam association, a network or UE may transmit indices of all Tx and Rx beams belonging to a Tx-Rx beam pair. Alternatively, the network or UE may indicate the beam association by transmitting an index of any one of the Tx and Rx beams.

For example, FIG. 8 assumes that the UE reports to the network a result of measuring Tx beam #1 through Rx beam #1 and a result of measuring Tx beam #2 through Rx beam #2. Thereafter, the network may intend to indicate the beam association of Tx beam #1 and Rx beam #1 in order to transmit control information using Tx beam #1. In this case, the network may signal both the index of Tx beam #1 and the index of Rx beam #1. However, even if the network signals any one of the two indices, the UE may know the beam association of Tx beam #1 and Rx beam #1. If the network signals Tx beam #1, the UE may attempt to receive the control information via Rx beam #1, which was used to measure and report Tx beam #1. Similarly, if the network signals Rx beam #1, the UE may attempt to receive the control information by assuming Tx beam #1, which was measured and reported through Rx beam #1.

Meanwhile, if the network signals Rx beam # N to the UE as a case in which multiple Tx beams (e.g., Tx beam # K, Tx beam # L) are measured and reported through Rx beam # N, the UE may recognize that multiple beam associations (e.g., Rx beam # N-Tx Beam # K, Rx Beam # N-Tx Beam # L, etc.) are indicated.

The above-described beam association and beam association indication method can be commonly applied to other examples which will be discussed later.

In order for a UE to measure beams that can be used in a corresponding cell or by a BS, a network can configure a known signal to which each beam is applied, for example, a Beam Reference Signal (BRS), a CSI-RS, a synchronization signal, etc. and transmit the known signal periodically (e.g., with a periodicity of 5 ms). According to the present invention, such a known signal can be classified as a signal related to initial access and a signal related to a CSI-RS configuration, which is received after the initial access. Additionally, a CSI-RS corresponding to a synchronization signal block may be configured after the initial access. The UE may select BS's Tx beams suitable for the corresponding UE by performing measurement in a subframe in which such a signal as a BRS, a CSI-RS, etc. is transmitted. This may be called beam management.

When Rx beams are further considered, the UE may perform measurement using different Rx beams in multiple BRS subframes and then select a combination(s) of the eNB's Tx beams and the UE's Rx beams.

After completion of the above processes, the Tx-Rx beam association between the eNB and UE can be determined explicitly or implicitly. If the UE uses multiple RSs for the beam management, the UE may manage/report Tx-Rx beam pairs per RS. For example, Tx-Rx beam pairs obtained by measuring a synchronization signal block and Tx-Rx beam pairs obtained by measuring a CSI-RS may be separately reported. Alternatively, the network may request the UE to provide feedback of one of them. Further, the CSI-RS measurement result may always be preferentially reported. If no CSI-RS transmission is configured, synchronization signal block based beam measurement may be set as a default and reported.

(1) Network Decision Based Beam Association

First, a beam measuring/reporting and associating method will be described. The method relates to beam measuring/reporting, and more particularly, to beam measurement/reporting and association, and it can be defined separately from beam association.

A network may instruct a UE to report top N Tx-Rx beam combinations having excellent measurement results. In this case, the number of reported beam combinations, N may be predefined or signaled to the UE from the network through higher layer signaling. Alternatively, after measuring beams or beam combinations, the UE may report all beam combinations of which measurement results are higher than a threshold. In this case, the measurement threshold may be predefined or signaled by the network. If each UE has different decoding performance, a category where UE's decoding performance is reflected may be defined, and a threshold may be defined per category.

In addition, beam combination reporting may be performed periodically and/or aperiodically by instructions from the network. Alternatively, if the difference between the current and previous measurement results is equal to or more than a predetermined level, the UE may perform the reporting in an event-triggered manner. In this case, the predetermined level may be predefined, or the network may inform the UE of the predetermined level through higher layer signaling.

The UE may report to the network one or multiple beam associations, which are determined according to the aforementioned method. The beam association may be, for example, a Tx-Rx beam index combination. If the UE reports multiple Tx beam indices or Tx-Rx beam index combinations, the UE may prioritize the Tx beam indices or Tx-Rx beam index combinations. For example, if the UE reports N Tx beams to the network, the N Tx beams may be reported as follows: 1st preferred beam, 2nd preferred beam, . . . , Nth preferred beam.

Based on the UE's report, the network may signal to the UE one or more multiple beam indices (e.g., Tx or Rx beam indices) or Tx-Rx beam index combinations where each UE should perform blind decoding for a control channel. In addition, the network may signal to the UE a subframe set for the signaled multiple beam indices or Tx-Rx beam index combinations (here, the subframe set may correspond to information on time resources where the UE should perform the blind decoding for the control channel by applying the corresponding Tx-Rx beam indices and, it can be represented on a subframe, slot, and or symbol basis.

Each UE may perform blind decoding for a control channel in the signaled beam indices/index combinations and/or subframe set. Alternatively, if no subframe set is signaled to the UE, the UE may perform the blind decoding on the assumption that there are Rx beams in all subframes based on the signaled beam indices/index combinations. Signaling the beam index combinations and subframe set to the UE could be interpreted to mean that the network signals to the UE Tx-Rx beam pairs and a resource set to be used by the UE in monitoring the corresponding beam pairs.

As another method, when signaling the beam association to the UE, the network may inform only beam indices. For example, a subframe set per beam or a beam index combination per subframe may be broadcast in advance. In other words, the resource set per beam may be signaled in advance, and information on beams the UE should monitor may be separately signaled.

(2) UE Decision Based Beam Association

In the UE decision based beam association, UE's preferred beams may be reported similar to the above-described (explicit) beam association.

According to the UE decision based beam association, a subframe or a subframe set where a UE should perform blind decoding can be determined based on a beam association(s) reported by the UE and a subframe set per beam or beam indices per subframe, which are pre-signaled (i.e., broadcast/dedicatedly signaled) by a BS, without BS's beam association confirmation or allocation.

For example, if the UE reports Tx beam #0 and 3 as the best beams, the UE may assume that the BS performs transmission using the corresponding beam, i.e., Tx beam #0 and/or #3. In addition, the UE may perform blind decoding for a control channel in a subframe(s) corresponding to Tx beams #0 and #3 in the subframe set per beam, which is pre-signaled by the network. Alternatively, the network may signal a subframe set where the blind decoding can be performed for the best beams reported by the UE.

Meanwhile, the two proposed methods: (1) Network decision based method and (2) UE decision based method may be selectively used per Search Space (SS). For example, it is possible to determine a search space for a remaining system information (RMSI) control resource set (CORESET) by selecting the best beams (or beam association) based on (2) UE decision based method. On the other hand, it is possible to determine a USS by selecting the best beams (or beam association) based on (1) network decision based method.

As system information incapable of being transmitted on a PBCH having a limited size, RMSI may include, for example, information for UE's initial access (e.g., PRACH resource, etc.). In addition, an RMSI CORESET may mean a set of resources for transmitting the RMSI during a UE's initial access procedure.

Hereinafter, the search space and CORESET of the NR will be described in brief. The search space may be configured in the CORESET. The CORESET is a set of resources for control signal transmission. A BS may signal information on the CORESET to a UE. The search space may be defined as a set of control channel candidates for which the UE performs blind detection. Specifically, one search space may be defined in one CORESET. For example, the CSS and USS may be defined in two CORESETs, respectively. Alternatively, multiple search spaces may be defined in one CORESET. For example, the CSS and USS may be configured in the same CORESET.

In other words, since it is difficult for the network to determine the best beam for a UE when the corresponding UE performs initial access, the UE may autonomously select the best beam for receiving system information such as RMSI, etc. The UE may search for the RMSI in an RMSI CORESET placed on the best beam selected by itself (in this case, the best beam may mean a synchronization signal block selected by the UE). For example, when a synchronization process is performed, each synchronization block may include a synchronization signal and a PBCH, and the PBCH may include information on the RMSI CORESET. In this case, the UE may assume that the RMSI CORESET indicated by the PBCH is transmitted via the same beam as the corresponding synchronization block. And, the UE may perform blind decoding for the corresponding CORESET by applying an Rx beam that is applied when the UE receives the corresponding synchronization block.

Thereafter, if the UE completes the initial access, the network may determine and signal a USS based on a UE's report. For example, if the best beams are determined based on a network's decision, the USS may be configured on the determined best beams.

Further, a hybrid method is available by combing (1) network decision based method and (2) UE decision based method. For example, if a UE reports its preferred beams to the network, the network may configure, for the UE, a sub-set or a full set for the reported preferred beams.

Information on the subframe set per Tx beam or information on the beam indices supported per subframe set may pre-signaled (e.g., via MIB, SIB, RRC signaling, etc.). For example, the information on the subframe set per Tx beam or the information on the beam indices supported per subframe set may be signaled with a predetermined periodicity (e.g., 20 ms, 40 ms, etc.) or through a PBCH every PBCH period.

More specifically, the network may provide multiple subframe sets for Tx-Rx beams to a UE through RRC signaling and then indicate activation/deactivation of the corresponding sets through a MAC control element (CE) or DCI. For example, the activation/deactivation of the individual sets may be separately indicated through a bitmap, where multiple bits are mapped to the subframe sets, respectively, and the corresponding bitmap may be transmitted using the MAC CE. The UE may attempt control channel detection only in activated subframe sets by assuming that there is a Tx-Rx beam(s). On the contrary, the UE may assume that no control information is transmitted in deactivated subframe sets. When the network configures Rx beams, the same method as the MAC CE can be used.

When the activation/deactivation of the individual subframe sets are indicated by the DCI, a reliability mechanism, which corresponds to the MAC CE, is required to eliminate an ambiguity. Here, the reliability mechanism may operate, for example, based on timing at which the corresponding DCI is transmitted or received, but the present invention is not limited thereto. For example, the subframe set activation/deactivation information included in the DCI may be applied after elapse of a specific time (e.g., N subframes) from a subframe in which the UE receives the DCI.

Meanwhile, since the purpose of the information on the subframe set per Tx beam or information on the beam indices supported per subframe is to indicate beam indices expected to be used by the network in a specific subframe, it is difficult for the network to change the beam configuration dynamically.

To overcome the disadvantage, an embodiment of the present invention proposes that a BS signals to a UE a Tx or Rx beam index (or Tx or Rx beam indices) the UE should assume in each subframe. For example, the BS may designate an Rx beam(s) the UE should configure in each subframe. In other words, the network may signal, to the UE, a Tx beam(s) (or Rx beam(s)) the UE should assume instead of signaling a Tx beam(s) the network will actually use every time. In this case, from the perspective of the UE, UE's power consumption may increase because blind detection needs to be performed on more resources, but from the perspective of the network, it has an advantage in that beams can be dynamically changed.

Since the network knows a Tx-Rx beam association(s) per subframe assumed when each UE performs blind decoding for a control channel, the network can flexibly change a Tx beam configuration to be actually used in a certain subframe.

In summary, when the subframe set is configured per Tx beam as proposed above, a UE may skip blind decoding in a subframe where its preferred Tx beam is not used, but the network cannot change a Tx beam configuration dynamically.

On the other hand, when a Tx beam(s) that a UE should assume in each subframe is indicated through UE or UE-group dedicated signaling, it has a disadvantage in that the UE should perform blind decoding even in a subframe where no control channel is transmitted, but it has an advantage in that the network can freely change a Tx beam configuration in consideration of the state of a cell, etc.

In this case, the network may signal Tx beam indices the UE should assume in each subframe based on UE's reporting results.

In addition, a Tx beam configuration and/or an Rx beam configuration such as subframe sets, etc. may be differently configured in each of the CSS and USS. For example, when system information such as RMSI is transmitted via a Tx beam, transmission resources (e.g., CSS or RMSI CORESET) for the corresponding system information may be configured based on the index of a synchronization signal block where the corresponding Tx beam is located. Therefore, a UE can know a set (e.g., CSS or RMSI CORESET) that the UE should monitor to detect the system information based on the index of the synchronization signal block. This method can be applied to a UE-group SS.

On the other hand, in the case of the USS, the network may signal a rough (coarse) direction of a beam in which a UE's USS is located or a subframe set or CORESET that a UE should monitor using an Rx beam in order to improve the flexibility of network scheduling. For example, when configuring the CORESET, the network may signal the subframe set or CORESET using a control channel monitoring period, an offset, etc.

The UE may receive either a parameter(s) for a Tx beam(s) or a parameter(s) for an Rx beam(s) among parameters for a Tx-Rx beam pair(s) in the corresponding CORESET or both of them.

<Rx Beam Assumption for Measurement>

The best beam(s) a UE reports may be a measurement result obtained by assuming one Rx beam or a measurement result obtained by assuming multiple Rx beams. In addition, the network may configure information on Rx beam(s) that the UE should assume for measurement.

For example, if the network instructs a UE to report three measurement results on the assumption of one Rx beam, the UE may perform measurement using all Rx beams but report only the three measurement results. Specifically, the UE selects an Rx beam used when measuring a Tx beam with the best measurement result among the measurement results. Thereafter, the UE may measure Tx beams using the corresponding Rx beam and then report Tx beams of which the measurement values are equal to or more than a threshold among the measured Tx beams. Similarly, the UE may bind Tx beams that can be received using the same Rx beam (for example, the Tx beams of which the measurement values are equal to or more than the threshold) and then report the bound Tx beams. This may include measuring and reporting per Rx beam and mean reporting one or multiple Tx beams that can be received per Rx beam.

In addition, there may be a restriction that the measurement results reported by the UE should be greater than a specific threshold. For example, if among the 1st, 2nd, and 3rd best beams the UE measures using a specific Rx beam, only the 1st best beam is greater than the specific threshold, the UE may report only the 1st best beam. Here, the specific threshold may be predefined or configured by the network.

As another example, the network may request a UE to report measurement results on the assumption of multiple Rx beams. In this case, the UE may combine Tx beams with Rx beams the UE uses when measuring the corresponding Tx beams, respectively and then report the combinations in order of measurement.

<Multiple Beam Observation>

When multiple Tx-Rx beam associations between a network and a UE are determined, the UE may perform control channel blind decoding for multiple Tx beams. Hereinafter, a method for enabling a UE to efficiently perform reception operation for multiple Tx beams will be described.

When there is one panel, an analog beam can be formed in a specific direction at a specific time (e.g., symbol, subframe) as described above. However, one or more analog beams may be formed at the same time according to capability such as the number of panels and the like. In case the number of beams to be formed is greater than capability, it is possible to set the number of beams corresponding to the capability to one unit and then form the beams at different times.

The above restriction may be equally applied not only to Tx analog beams but to Rx analog beams. Thus, if the beam association between a BS and a UE is composed of combinations of different Rx beams corresponding to different Tx beams and the UE applies only the same Rx beam in one subframe, the UE may perform blind decoding only for one Tx beam per subframe.

Hereinafter, a method for enabling a UE to perform blind decoding for multiple Tx beams in one subframe for more flexible scheduling and fallback operation will be described.

(1) Example 1: Subframe-Based Beam Selection

For example, an Rx beam(s) or a Tx beam(s) can be selected based on a subframe.

A UE may attempt control channel decoding by applying a different Rx beam(s) to each subframe. For example, the UE may attempt the control channel decoding by assuming an Rx beam(s) suitable for a Tx beam(s) used in a specific subframe.

In this case, the Tx beam(s) and/or Rx beam(s) the UE should assume may be determined based on the Tx-Rx beam association between the network and UE. If it is determined by the beam association that the UE should assume multiple beam combinations per subframe, the Tx-Rx beam combinations may be prioritized. That is, in one subframe, the UE may first perform blind decoding for a beam combination with the highest priority. The priority-based blind decoding method can be applied when a UE uses multiple Rx beams at the same time. For example, prioritization may be applied while the UE selects multiple Tx beams and/or Rx beams to perform control channel blind decoding.

Figure 9:
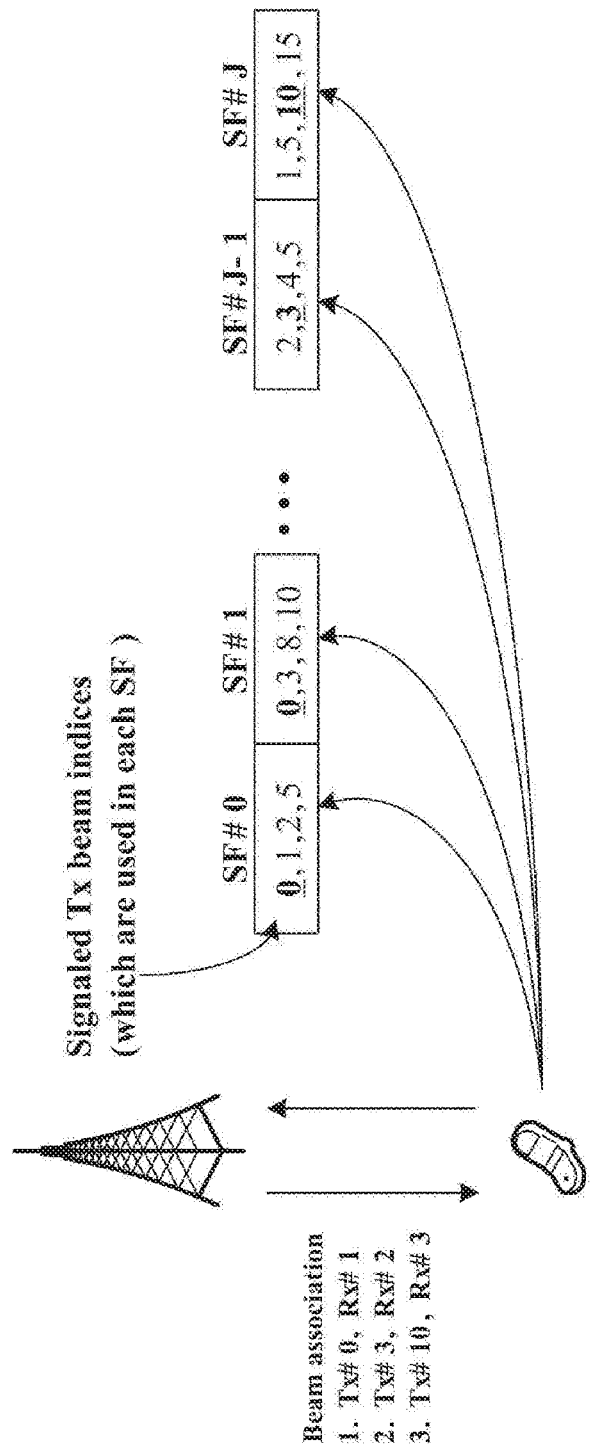
FIG. 9 illustrates an example of subframe-based beam selection.

FIG. 9 illustrates an example of the subframe-based beam selection. FIG. 9 assumes that a UE attempt control channel decoding for three Tx-Rx beam combinations through coordination with a network. In addition, although FIG. 9 represents a beam association by combining Tx and Rx beams, the beam association may be defined using Tx beams only.

The beam association defined with only Tx beams can be applied when a UE reports its preferred beams. For example, the UE may exclude an Rx beam the UE applies for a specific Tx beam when sending a report.

Moreover, FIG. 9 assumes that Tx beam indices used by the BS per subframe are transmitted through UE-dedicated signaling or broadcast. Also, it is assumed that transmission is performed using four Tx beams in each subframe.

Further, it is assumed that the network and UE determine the order of priority of the corresponding beam combinations as follows: {Tx beam #0-Rx beam #1}, {Tx beam #3-Rx beam #2}, {Tx beam #10-Rx beam #3}.

When it is assumed that the UE uses only one Rx beam in one subframe, the UE may assume that Tx beam #0 is used in subframe #0 based on the priority order per beam combination. Thus, the UE may attempt control channel blind decoding by applying Rx beam #1 in order to detect control information transmitted via Tx beam #0. Similarly, the UE may attempt control channel decoding by assuming {Tx beam #0, Rx beam #1}, {Tx beam #3, Rx beam #2}, and {Tx beam #10, Rx beam #3} in subframe #1, subframe # J−1, and subframe # J, respectively.

If a Tx beam(s) the UE should assume in each subframe is signaled, the UE may assume the Tx beam signaled by the network and then perform blind decoding by setting an Rx beam suitable for detecting the assumed Tx beam. If it is signaled that two Tx beams should be assumed in one subframe, the UE may perform the blind decoding by assuming one Tx beam with higher priority of the two Tx beams. Alternatively, if Rx beams associated with the two Tx beams are equal to each other, the UE may perform reception using the corresponding Rx beam.

(2) Example 2: Symbol-Based Beam Selection

Meanwhile, if a UE is configured with multiple BPLs, that is, multiple beam associations, a CORESET may be configured per BPL or the multiple BPLs may be configured in one CORESET.

As an example of configuring a CORESET in each BPL, a first CORESET for a first BPL may be configured in a first symbol(s) among multiple symbols in a subframe, and a second CORESET for a second BPL may be configured in a second symbol(s).

Since a UE can perform reception operation by applying a different Rx beam per symbol, the network may configure multiple control symbols in one subframe. Here, a control symbol may mean a symbol where control information can be transmitted or a symbol where a CORESET is configured. The network may broadcast the number of control symbols or inform UEs in a cell of the number of control symbols through higher layer signaling. The provision of the number of control symbols performed by the network for the UEs could be interpreted to mean that time-domain resources in the CORESET are allocated.

Alternatively, the number of control symbols may be signaled through a physical channel similar to a PCFICH. The network may inform the number of control symbols at each period or through aperiodic signaling. In addition, the network may allocate a different number of control symbols per subframe or per subframe set.

The number of control symbols per subframe may mean the maximum number of control symbols for which a UE can perform blind decoding using different Rx beams in a corresponding subframe. When multiple control symbols are configured, a UE may perform blind decoding using a different Rx beam and/or Tx beam in each symbol. For example, a different CORESET may be configured per symbol, and a different Tx beam and/or Rx beam may be configured per CORESET. Alternatively, one CORESET may be configured, and a different search space may be formed per symbol in the CORESET.

The present example could be interpreted to mean that a search space corresponding a different Rx beam and/or Tx beam is configured in each control symbol.

Figure 10:
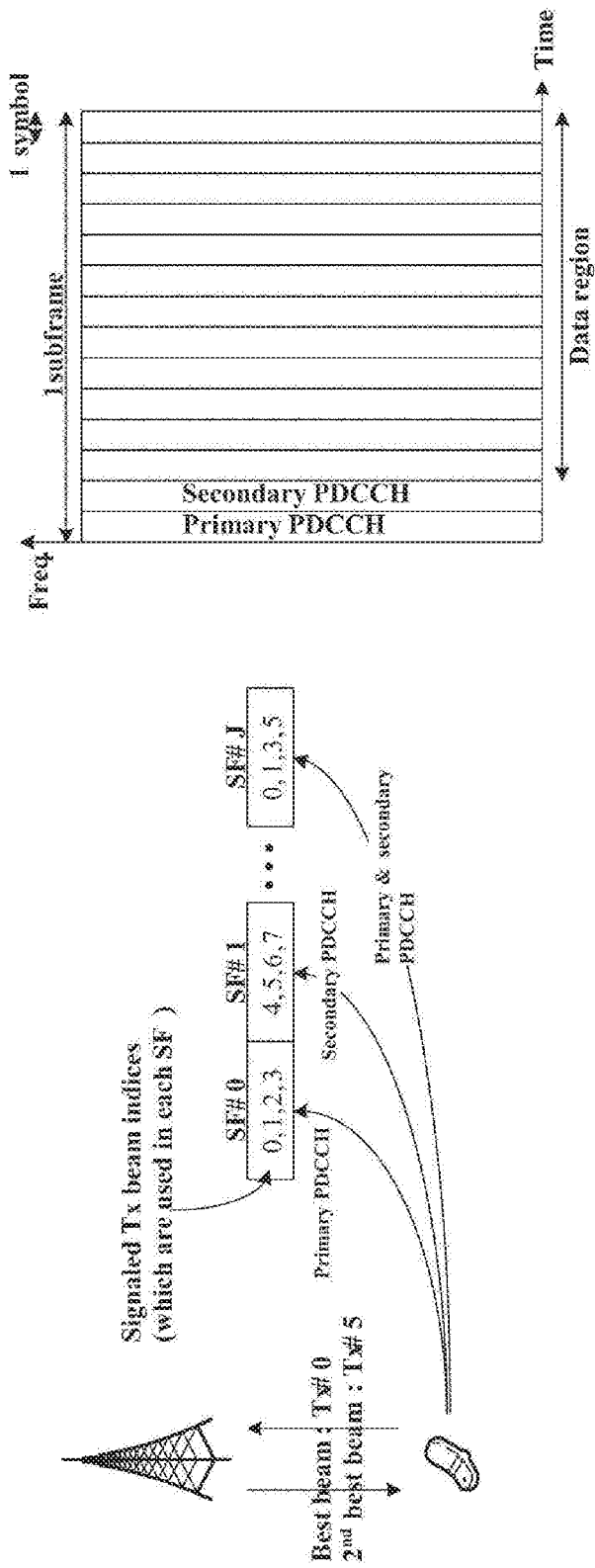
FIG. 10 illustrates an example of configuring control symbols.

FIG. 10 illustrates an example of configuring control symbols according to an example of the present invention.

Although the following example assumes that there are two control symbols, the prevent invention can be applied when two or more control symbols are used.

By configuring different CORESETs in different symbols, the network may instruct a UE to perform PDCCH monitoring for different Tx beams. Alternatively, the network may configure different search spaces in different symbols in one CORESET and instruct a UE to perform PDCCH monitoring for different Tx beams based on the corresponding search spaces. In this case, each CORESET or search space may be defined in at least one symbol. Although FIG. 10 shows that difference search spaces are configured in the first and second symbols and a UE monitors a Tx beam with the first priority in the search space configured in the first symbol and a Tx beam with the second priority in the search space configured in the second symbol, this is merely an example and the present invention is not limited thereto. In other words, FIG. 10 can be interpreted as one of various examples of the present invention, where linkages between CORESETs or search spaces and Tx beams (or Tx-Rx associations) are configured by the network.

FIG. 10 assumes that a network and a UE determine Tx beam #0 as the best beam and Tx beam #5 as the second best beam through the above-described beam association process and the network signals Tx beam indices per subframe in advance. In addition, it is assumed that the network signals to the UE that control information is to be transmitted in two control symbols in a corresponding subframe. The embodiment of the present invention can be applied when the beam association between the network and UE includes two or more beam combinations and/or when there are two or more control symbols.

In FIG. 10, the first control symbol and the second control symbol may be set to a primary PDCCH (or primary CORESET) and a secondary PDCCH (or secondary CORESET), respectively. Here, the primary and secondary PDCCHs may mean the order of priority of the best beams.

The UE may independently configure different search spaces for different Tx beams in each of the control symbols and then perform blind decoding. For example, the UE may assume Tx beam #0 in subframe #0 and perform blind decoding for the primary PDCCH. In addition, the UE may assume Tx beam #5 in subframe #1 and perform blind decoding for the secondary PDCCH. Similarly, in subframe # J, the UE may perform the blind decoding for the primary PDCCH by assuming Tx beam #0 and perform the blind decoding for the secondary PDCCH by assuming Tx beam #5.

Meanwhile, only some of the best beams may be used in one subframe, for example, subframe #0 or subframe #1. In this case, the UE may configure a search space using two symbols on the assumption that Tx beam #0 is used for both of the primary and secondary PDCCHs. To this end, the network may signal a Tx beam(s) that should be assumed in each symbol.

According to Example 2, since a UE is able to perform blind decoding for multiple Tx beams in one subframe, the UE can handle scheduling issues and beam switching more flexibly.

When a Tx beam(s) that a UE should assume in each subframe is signaled, the UE may configure an Rx beam(s) by assuming the Tx beam(s) that the network signals and perform blind decoding for a specific subframe. For example, if it is signaled that the UE should assume two Tx beams in one subframe, the UE may perform blind decoding for a Tx beam with higher priority on a primary PDCCH and perform blind decoding for a Tx beam with lower priority on a second PDCCH.

Figure 11:
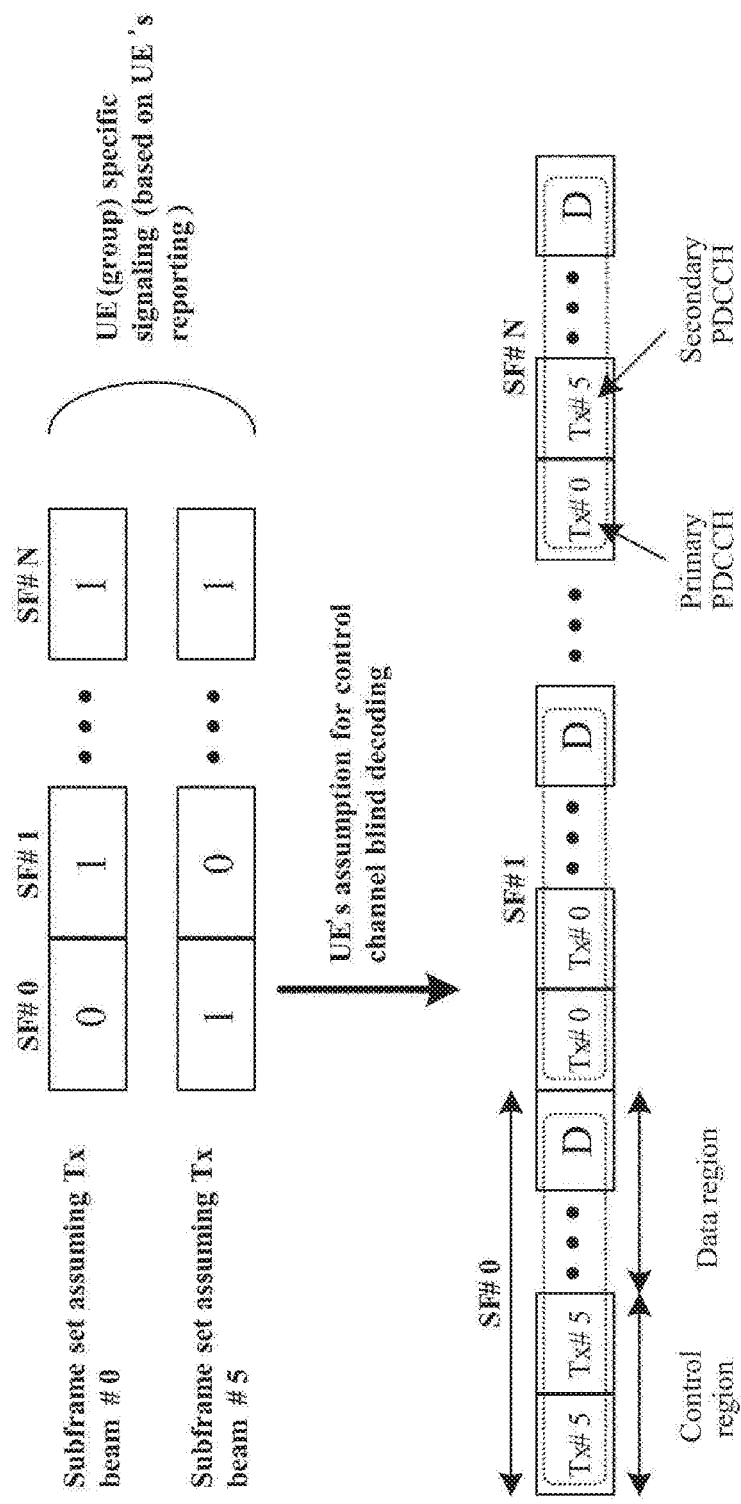
FIG. 11 illustrates an example of Tx beams that a UE should assume to perform blind decoding.

FIG. 11 illustrates an example of Tx beams that a UE should assume to perform blind decoding. Specifically, a network may signal a Tx beam(s) that the UE should assume to configure an Rx beam(s) and a search space(s) in each control symbol.

If the UE assumes only one Tx beam in each subframe, the UE may configure a search space on the assumption that two control symbols have the same Tx beam. Alternatively, the UE may configure a search space using either a primary PDCCH or a secondary PDCCH based on the order of priority of Tx beams.

If multiple symbols are present in one CORESET, the UE may assume that Tx-Rx beam pairs are applied in implicit order in each of the symbols. The application order of the Tx-Rx beam pairs may be signaled by the network to the UE or implicitly determined according to indices of the Tx-Rx beam pairs. If the network configures the application order of the Tx-Rx beam pairs for the UE, it could be interpreted to mean that the network configures a monitoring set for Tx beams in a symbol-based manner. The implicit decision of the application order of the Tx-Rx beam pairs may include determining symbol indices based on the order of priority of beams (e.g., primary beam, secondary beam, etc.).

(3) Example 3: 1 Rx Beam Case

The 1 Rx beam case may mean that a UE uses an omni-direction Rx antenna or that some or all of the best beams reported by a UE are measured on the basis of one identical Rx beam. In addition, a network may instruct a UE to report multiple best beams under the restriction of one identical Rx beam. When reporting the multiple best beams, the UE may report the index of the Rx beam applied when measuring individual Tx beams or Tx beams measured by the same Rx beam among the measured Tx beams together.

Since the same Rx beam is used, the UE may perform blind decoding by assuming one Tx beam for all control symbols. For example, from the perspective of the UE, since only one Rx beam is used even though a different Tx beam is configured in each symbol, the UE may perform the blind decoding by considering all symbols as one CORESET.

As proposed above, a network may signal a Tx beam(s) that a UE should assume in each subframe. In this case, for a specific subframe, the UE may configure an Rx beam(s) by assuming the Tx beam(s) that the network signals and perform blind decoding. For example, if the UE receives signaling that the UE should assume two Tx beams in one subframe, the UE may separately configure a search space for each Tx beam and perform the blind decoding.

<Search Space Determination Based on Priority>

Hereinabove, the method in which a UE performs blind decoding for multiple Tx beams has been described. In the following description, a method for determining a search space for each beam based on the order of priority of Tx beams will be discussed. The following embodiments can be applied to all of Examples 1, 2 and 3.

The priority order of Tx beams may be determined based on UE's measurement results. For example, a beam having the best measurement result may have the highest priority.

For example, when a UE performs blind decoding for multiple Tx beams, the UE may determine the number of control channel candidates included in a search space for each of the Tx beams based on the priority order. In FIG. 10, the UE may configure a search space for Tx beam #0 (i.e., a search space for a primary PDCCH) in a primary PDCCH symbol of SF # J and a search space for Tx beam #5 (i.e., a search space for a second PDCCH) in a secondary PDCCH symbol of SF # J. In this case, the number of control channel candidates allocated to the search space for the primary PDCCH may be more than that allocated to the search space for the second PDCCH. For example, when a search space is defined as a set of control channel candidates for which a UE should attempt blind detection, the primary PDCCH search space may be composed of N control channel candidates and the secondary PDCCH search space may be composed of M control channel candidates, where M is smaller than N.

Different search spaces may be used for blind decoding of different DCI formats. For example, the primary PDCCH search space may be used for the purpose of blind detection of a Transmission Mode-dedicated (TM-dedicated) DCI format (e.g., DCI format 2C/2D in the LTE), and the secondary PDCCH search space may be used for the purpose of blind detection of a TM-common DCI format (e.g., a DCI format for fallback). In other words, a mapping relationship between beams and DCI formats can be defined. The beam corresponding to the primary PDCCH may be mapped to the TM-dedicated DCI format, and the beam corresponding to the secondary PDCCH may be mapped to the TM-common DCI format.

In addition, different Tx beams may be configured depending on information the network desires to transmit. For example, blind decoding for DL assignment for transferring information on DL data transmission may be performed in the primary PDCCH search space, and blind decoding for a UL grant for transferring information on UL transmission may be performed in the secondary PDCCH search space.

<Multiple Beam Observation for CoMP Operation Control>

The embodiments of the present invention may be applied in order to transmit a control channel in CoMP mode. For example, the CoMP operation between neighbor cells such as Dynamic transmission/reception Point Selection (DPS) or Joint Transmission (JT) may be performed for the control channel. According to an embodiment of the present invention, a network may instruct a UE to perform blind decoding for Tx beams of each cell.

The network may receive, from a UE, not only measurement results of a serving cell and/or beams of the serving cell but also measurement results of a neighbor cell and/or beams of the neighbor cell. Thereafter, based on the reported measurement results, the network may signal Tx beam indices per subframe and/or Tx beam indices the UE should assume in each subframe. In addition, information on each Tx beam may be signaled together. For example, quasi co-location (QCL) information that the UE should assume when performing decoding for a corresponding Tx beam and information on a cell transmitting the corresponding Tx beam (e.g., cell ID, virtual cell ID, etc.) may be signaled together.

A different CORESET may be configured for each Tx beam, and a different monitoring set and different QCL may be assumed for each CORESET. For example, the network may associate multiple CSI-RS ports with the serving and neighboring cells and signal QCL with different CSI-RS ports in each CORESET.

Since transmission from multiple cells does not commonly occur, the transmission from the multiple cells may be indicated by independent signaling. For example, the network may signal Tx beam indices per subframe for the serving cell or Tx beam indices that the UE should assume in each subframe in the same manner as described above and indicate multiple beam observation considering the neighbor cell's beams, using additional RRC signaling or DCI in the previous subframe.

In addition, information on transmission and reception using the multiple beam observation may also be signaled. For example, the network may transmit to a UE which one of single cell operation, DPS, JT, and repeated transmission is used for control channel transmission.

If a control channel is repeated, information on the repeated transmission may be defined or signaled in advance. For example, if a UE needs to perform blind decoding for multiple beams in one subframe as shown in SF # N of FIG. 11, the network may signal to the UE that a control channel will be repeated. Specifically, the network may define/signal in advance that the repetition is performed on the same control channel candidate index in each control symbol or Tx beam or that the repetition is performed based on an index offset between control channel candidates of the primary and second PDCCHs. This could be interpreted as a transmit diversity scheme using different analog beams.

For example, different CORESETs may be defined in different symbols of one subframe, and the network may transmit the same control information in the different CORESETs. The same control information (e.g., PDCCH) may be mapped to the same location in each symbol or different locations (e.g., frequency hopping).

Meanwhile, the Tx-Rx beam association can be replaced with the term of "Beam Pair Link (BPL)" as described above. A UE measures a synchronization signal, a PBCH DMRS, or a designated CSI-RS (e.g., a CSI-RS for beam management) and performs reporting (e.g., a preferred beam, a strong beam list, etc.) based on the measurement results. Thereafter, when receiving information on a Tx beam(s) that the corresponding UE should monitor, an Rx beam(s) to be used in reception operation, and a resource(s) for performing the reception operation (e.g., a monitoring set, a slot, a subframe, a symbol, or sets thereof) according to the network's confirmation or configuration, the UE may obtain the BPL. Here, the monitoring set may be defined in the time domain together with the subframe set, slot set, or symbol set, but the present invention is not limited thereto. That is, the monitoring set may be defined together with an RB set in the frequency domain. Further, the monitoring set may be defined in the time-frequency domain.

Regardless of the BPL, each UE may be configured with a CORESET to perform blind decoding for a control channel. The CORESET may mean a resource region for designating a search space to be used by a UE when performing blind decoding for a control channel. A CORESET configuration may include information for performing blind decoding in a corresponding CORESET such as time/frequency resources for designating a CORESET region in one slot, resources where the corresponding CORESET should be monitored (e.g., a monitoring set, a slot, a subframe, a symbol, or sets thereof), Control Channel Element-to-Resource Element Group (CCE-to-REG) mapping that should be assumed in the corresponding CORESET, PDCCH-to-CCE mapping, search spaces, RS configurations, REG bundle parameters, etc.

Figure 12:
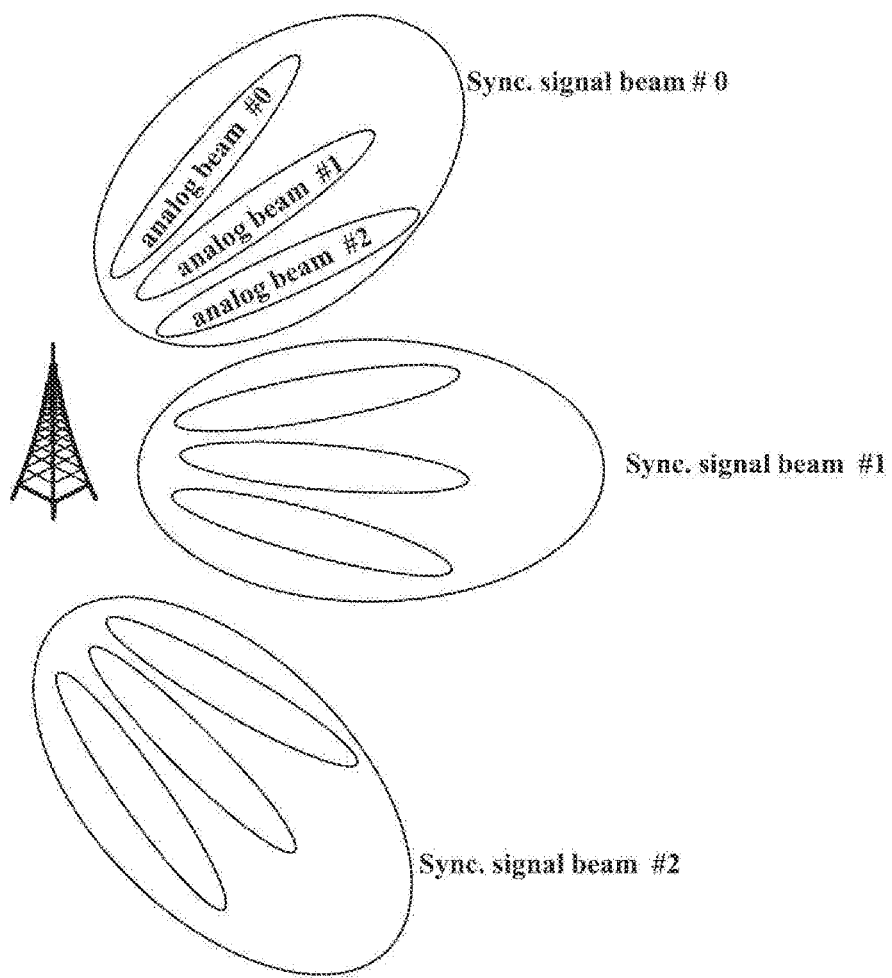
FIG. 12 illustrates an example of configuring beams in a network performing multiple beam observation.

FIG. 12 illustrates an example of a beam configuration in a network performing multiple beam observation.

FIG. 12 assumes that a BS has multiple panels and a different analog beam can be implemented in each panel. A Synchronization Signal (SS) beam may mean a beam corresponding to coverage of each SS block in the initial access procedure. When the BS has the multiple panels, individual analog beams formed in an SS block may be simultaneously transmitted via the panels.

In this case, a UE may recognize that one SS beam is received within SS coverage. In FIG. 12, if the BS performs transmission and reception using only one panel, the SS beam may become equal to the analog beam. An SS beam may be called an SS block.

During the initial access procedure, the UE performs measurement for each SS beam and then selects a specific SS beam. After selecting the SS beam, the UE may decode a Physical Broadcast Channel (PBCH) associated with the corresponding SS beam and calculate a CSS for detecting RMSI or a CORESET including the corresponding CSS based on the PBCH information. In this case, the RMSI may be regarded as a set of some of the SI in the legacy LTE, which is necessary for initial access.

Thus, it is desirable that the COREST or CSS for the RMSI transmission and reception is configured within the coverage of the SS beam selected during the initial access procedure. In this case, the UE may assume that the 'CORESET or CSS for the RMSI' is QCLed with the 'SS, PBCH, and/or PBCH DMRS'. For example, the UE may assume that a tracking RS or a wideband control channel DMRS is QCLed with the SS block. Alternatively, the UE may additionally receive a QCL relationship between the CORESET or CSS for the RMSI and a CSI-RS. In other words, the QCL may be configured between the 'CORESET or CSS for the RMSI transmission' and the 'SS block, tracking RS, wideband RS and/or CSI-RS'. Specifically, the UE may receive the CSI-RS associated with the SS block in a process after the initial access. By doing so, the QCL between the SS block and CSI-RS may be established for operations after the initial access.

After completing the initial access procedure, the UE may receive a CSI-RS configuration from the network for analog beam selection. Based on the CSI-RS measurement/report, the UE may receive at least one association (i.e., BPL) between network's Tx beams and UE's Rx beams.

In order for a UE to receive control information and data in an area where the multiple beam observation is performed, the UE requires the above-described BPL information and CORESET information. Hereinafter, a method for signaling BPL information and CORESET information and a relationship between a BPL and a CORESET will be described. An SS beam may be QCLed with an SS block, or it may mean a beam associated with a CSI-RS equivalent to the SS block. In addition, an analog beam may mean a beam associated with a CSI-RS configured by a network for the purpose of beam management and the like.

<Common Search Space (CSS) & UE-specific Search Space (USS)>

Hereinafter, a CSS may imply a CORESET in which the CSS is configured, and a USS may mean a CORESET in which the USS is configured.

In addition, the USS and CSS may have different QCL configurations. For example, the USS and CSS may be QCLed with different CSI-RS ports, respectively. As another example, the USS may be QCLed with a CSI-RS, and the CSS may be QCLed with an SS block. This could be interpreted to mean that in the USS, a UE performs reception using an RX beam used when the UE receives a specific CSI-RS, and in the CSS, a UE performs reception using an Rx beam used when the UE receives an SS block.

When the multiple beam observation is performed as shown in FIG. 12, an RRC-connected UE may receive CORESETs for the CSS and USS via RRC signaling.

In FIG. 12, the USS may be configured per analog beam in consideration of a channel state between a network and a UE. In other words, the USS may be configured in each BPL. On the other hand, in the case of the CSS, since multiple UEs can monitor the CSS, it is desirable that the CSS is configured per SS beam.

In addition, a UE may be out of analog beam coverage due to its mobility, and in this case, the UE may fail to decode UE-specific DCI. To handle this situation, fallback operation is required. The fallback operation may be performed based on the CSS. That is, it is desirable to secure coverage wider than the USS (or it is desirable to perform transmission via a beam wider than the USS).

If a UE is configured with multiple analog beams belonging to different SS blocks as a BPL, the resource region of the CSS, where the fallback operation is to be performed, may vary per analog beam. For example, the UE may need to monitor the CSS in different CORESETs in order to perform the fallback operation. More particularly, assuming that a UE is configured with analog beam "a" belonging to SS beam #0 and analog beam "b" belonging to SS beam #1 in FIG. 12, the UE may perform the fallback operation for analog beam "a" in the CSS associated with SS beam #0 and perform the fallback operation for analog beam "b" in the CSS associated with SS beam #1.

In the present invention, the purpose of the CSS is not limited to the fallback operation but includes transmitting common control information for the NR system. A UE may perform blind decoding for multiple CSSs which are QCLed with different SS blocks, respectively. In addition, the UE may perform fallback operation for one of the USSs that the UE should monitor in another CSS.

According to an embodiment of the present invention, for each USS, a CSS where fallback operation for a corresponding USS is to be performed may be differently configured. Alternatively, for each BPL, a CSS or BPL where fallback operation for a USS(s) belonging to a corresponding BPL may be configured. In this case, different monitoring sets may be configured for CSSs, and a monitoring set for each CSS may be determined independently from that for a USS associated with a corresponding CSS. However, the present invention does not exclude that different USSs use one identical CSS for the fallback operation. In addition, each BPL configuration may include a CSS associated with each BPL or a monitoring set for a CORESET for configuring the CSS. Alternatively, CSS CORESET information associated with each USS's CORESET may be given. Further, a BPL may be configured independently per CORESET, and a UE may receive a BPL configuration according to a network's CORESET configuration.

If a BS has one panel, an SS beam may be identical to an analog beam. In this case, it may be desirable to configure the USS and CSS in one same CORESET. To this end, the network may inform each UE of a relationship between the USS and CSS. For example, each UE may be provided the following information through RRC signaling: whether the USS and CSS coexist in one CORESET; a monitoring set of the CORESET for the USS/CSS; resource allocation of the CORESET for the USS/CSS; and/or whether there is a pairing between the USS(s) and CSS.

When a UE performs decoding for the CSS, the UE may configure an Rx beam(s) based on a BPL associated with the CSS. Alternatively, the network may designate an Rx beam(s). For example, if multiple analog beams are included in one SS block, the UE may consider an Rx beam optimized for an SS block to which an analog beam associated with the USS belongs as an Rx beam for decoding the CSS. Alternatively, if a UE periodically performs the beam management, the UE may also perform SS block measurement. In this case, the UE may select an Rx beam to be used for CSS decoding based on information of a serving SS block the UE updates most recently. If an Rx beam used in the associated USS is used as an Rx beam for the CSS or if the SS block measurement is performed, it may be configured based on the measurement result of the SS block.

Hereinabove, the method of configuring a CSS or a CORESET for setting the CSS per BPL has been described. However, if BPLs are prioritized (e.g., primary BPL, secondary BPL, etc.), a CSS or a CORESET for setting the CSS may be configured only for a BPL with high priority for the purpose of complexity reduction. For example, if an SS block including a Tx beam corresponding to a serving BPL is associated with Rx beam #1, a UE may perform blind detection for the CSS using Rx beam #1. In addition, the configuration of the primary BPL may include information on a CORESET for the CSS, information on a monitoring set, etc.

When performing rate-matching for control information and data or configuring resources, the UE may consider such a BPL configuration. For example, if two CORESETs or search spaces for two different BPL pairs, and more particularly, two different BPL pairs having different Rx beams are configured on the same resources, the UE may assume that the two CORESETs are prioritized. Moreover, if the CSS and USS overlap with each other, the UE may assume that the CSS has higher priority. Further, if two USSs overlap with each other, the two USSs may be prioritized based on measurement results, CORESET indices, or the number of rounds of blind detection.

Additionally, if the UE is unable to form multiple Rx beams in one symbol and if resources for the Rx beams partially overlap, an entire OFDM symbol may be rate-matched for a specific Rx beam, or the entire OFDM symbol may not be used. In this case, the UE may assume that for a CORESET or search space to which the corresponding Rx beam is applied, no REG/CCE is mapped to the entire OFDM symbol. If multi-symbol duration is configured, overall duration can decrease.

Thus, when the resources are shared, information on the Rx beams should be at least the same. In case the CSS/USS or the USS/USS are mapped to the same resources, if Rx beams for these search spaces are slightly different from each other, the UE may perform blind detection for the two search spaces using an Rx beam for a search space with higher priority. And, the UE may adopt the configuration of the higher-priority search space on the resources where the Rx beams overlap. In this case, the UE may determine whether to perform rate-matching or whether to adopt the configuration of the higher-priority search space as follows.

- If two BPLs are QCLed with one same SS block or associated with one same cell ID, the configuration of a search space with lower priority may become equal to that of a search space with higher priority. Otherwise, the UE may regard the two BPLs as different BPLs and then perform rate-matching of the lower-priority search space.
- If two BPLs are QCLed with one same beam measurement CSI-RS, the configuration of a search space with higher priority may become equal to that of a search space with lower priority. Otherwise, the UE may regard the two BPLs as different BPLs and then perform rate-matching of the lower-priority search space.
- The network may make an explicit configuration. Since even in one CORESET, different RX beams may be configured per symbol or per resource, an Rx beam for a lower-priority search space may be set equal to that for a higher-priority search space on resources where the two search spaces overlap.
- The UE may make a decision. In this case, there may be an ambiguity issue between the network and UE.

<Association Between BPL and CORESET>

A network may sweep possible beams and create a list of UEs that the network can serve per beam based on a UE's measurement report on a corresponding beam. The network may determine a resource region (e.g., a subframe set, a slot set, or a symbol set) where each Tx beam is used based on the list and then inform the UEs of the determined resource region.

Hereinafter, operation per beam is described based on a slot, but the operation per beam can also be defined on a subframe or symbol basis.

If a UE performs blind decoding for all slots, it may increase UE's power consumption. In addition, if the UE uses an inappropriate Rx beam, its reception performance may be degraded due to a low SINR and the like. Hence, the UE needs to perform reception using an appropriate Rx beam in a proper slot based on BPL information, which is delivered from the network.

If a CORESET configuration received by the UE is different from a resource to which each BPL is applied, the UE may perform unnecessary operations or malfunction. Thus, it is desirable to match a monitoring set to which each BPL is applied with a monitoring set where blind decoding for each CORESET should be performed.

Hereinafter, methods for matching a monitoring set to which each BPL is applied with a monitoring set where blind decoding for each CORESET should be performed will be described. In the following examples, a BPL may mean a linkage between a network's Tx beam(s) and a UE's Rx beam(s). BPL information may be signaled such that resources for the Tx and Rx beams are indicated in a UE-specific manner. Alternatively, the BPL information may be transmitted such that a Tx beam (set) that the UE should monitor is signaled in a UE-specific manner based on the network's Tx beam(s), which is previously indicated as common or group-common information, and resources used for the corresponding Tx beam(s). Further, the BPL could be interpreted as a QCL assumption related to beam selection.

(1) Example A: CORESET Configuration Per BPL

The network may configure a CORESET per BPL and transmit relevant information to the UE through higher layer signaling, a MAC CE, or the like. For example, only one BPL may be assumed in one CORESET, and only one QCL assumption may be applied to the corresponding CORESET. To this end, the network may configure, for each UE, a monitoring set per BPL and multiple CORESETs (e.g., localized/distributed) for a corresponding BPL. In addition, the network may configure a CORESET monitoring set for each CORESET. As described above, the BPL can be signaled in the form of a Tx beam(s), an Rx beam(s), a Tx-Rx beam combination, etc. When the BPL is signaled as the Tx beam(s), the UE may monitor resources to which the corresponding BPL is applied using an Rx beam that shows the best reception performance with respect to the corresponding Tx beams(s).

In this case, a CORESET monitoring set may be assumed to be a subset of a corresponding BPL monitoring set. Alternatively, the UE may assume a BPL monitoring set as a monitoring set of a corresponding CORESET. In addition, a CORESET for the use of a fallback for UE-specific control signaling and a CORESET for configuring the CSS where common control information is transmitted may be configured per BPL as proposed above. In this case, a monitoring set for the CORESET for configuring the CSS may not belong to the corresponding BPL monitoring set. The CSS or CORESET for the CSS and the USS may be defined in different BPLs. Moreover, different QCL assumptions may be configured for the CSS or CORESET for the CSS and the USS, respectively.

In addition, instead of configuring a CORESET per BPL, it is possible to signal a CORESET per UE's Rx beam that the UE should assume. In this case, a BPL may be configured on an Rx beam basis. Specifically, a CORESET(s) may be configured per Rx beam that the UE can use, and configurations such as a monitoring set may be signaled per CORESET.

(2) Example B: BPL Configuration Per CORESET

As another method for configuring an association between a BPL and a CORESET, a BPL to which a corresponding CORESET is applied may be configured per CORESET. In this case, a monitoring set for each BPL may be replaced with a CORESET monitoring set. Each CORESET may include a search space type supported by a corresponding CORESET. In the case of a CORESET where the CSS is configured, the number thereof may be determined according to the number of UE's BPLs. In addition, if multiple CORESETs are configured for multiple CSSs, some of the multiple CORESETs may be equal to each other. This is because when a BPL is formed with respect to multiple analog beams belonging to one SS block, the corresponding analog beams need to use the same CSS for the fallback operation.

(3) Example C: Separate Configuration of BPL and CORESET

In Example A and B, if a BPL configuration/update period does not match with a CORESET configuration/update period, the network should repeatedly transmit all information whenever signaling BPL/CORESET configurations. To overcome such a disadvantage, the network may independently signal the BPL configuration and the CORESET configuration and provide an assumption for eliminating an ambiguity that may occur.

If a UE monitors resources that are not its own BPL, it may increase UE's power consumption, and thus the UE needs to perform reception in a BPL monitoring set. This could be equally applied to a CORESET monitoring set. Eventually, the UE may perform monitoring for a PDCCH in a region where the BPL monitoring set and the CORESET monitoring set overlap.

For example, multiple BPL monitoring sets may be configured in each BPL, and similarly, multiple CORESET monitoring sets may also be configured. The network may include information on a CORESET(s) capable of monitoring a corresponding BPL in the BPL configuration or include information on a BPL to which a corresponding CORESET should be applied in the CORESET configuration.

However, the UE may monitor the CORESET for the CSS even though the CORESET for the CSS does not overlap with the BPL monitoring set. If the network transmits common control information via different Tx beams, the UE may increase the probability of receiving the common control information by increasing the number of monitoring rounds.

Meanwhile, the BPL and CORESET can be reconfigured as follows.

(i) The time/frequency resources of the CORESET can be configured semi-statically, and the BPL associated with the corresponding CORESET can be changed dynamically. BPL information in the CORESET is configured with a BPL index, and the network may change the BPL information to which the CORESET is to be mapped by dynamically changing the BPL information mapped to the BPL index.

(ii) Both of the CORESET and BPL can be configured semi-statically only.

(iii) Both of the CORESET and BPL can be changed dynamically. The CORESET index and BPL information may be simultaneously changed. Multiple CORESETs and multiple pieces of BPL information may be dynamically mapped.

Alternatively, the CORESET may be configured per BPL, and activation/deactivation may be configured per CORESET. However, in this case, there is a disadvantage in that the CORESET per BPL should be separately configured in each Bandwidth Part (BP). To reduce this signaling overhead, all the basic information of the CORESET may be composed of configuration building blocks, and the network may signal the indices of a plurality of building blocks.

For example, monitoring intervals may be configured separately from frequency information. The network may configure multiple pieces of REG-CCE mapping, TxD, duration, etc. and then include one of them in each CORESET. The network may separately configure the BPL information and configure BPLs to be mapped to individual CORESETs.

To reduce fallback issues, the network may change the CORESET/BPL in a similar manner to the scheme for BP adaptation/activation.

Meanwhile, NR-PDCCH transmission should be robust to BPL blocking, and a UE may be configured to monitor NR-PDCCHs in multiple BPLs at the same time. Also, the UE may be configured to monitor NR-PDCCHs in different BPLs of different NR-PDCCH symbols.

To monitor NR-PDCCHs in multiple BPLs, parameters related to a UE's Rx beam configuration may be set through higher layer signaling or a MAC CE, and the corresponding parameters should be considered in designing a search space.

A Spatial QCL assumption between DMRS antenna ports for demodulation of a DL control channel and DL RS antenna ports may be indicated to receive the DL control channel.

A QCL configuration for a UE-specific NR-PDCCH may be provided by means of RRC or MAC CE signaling.

Figure 13:
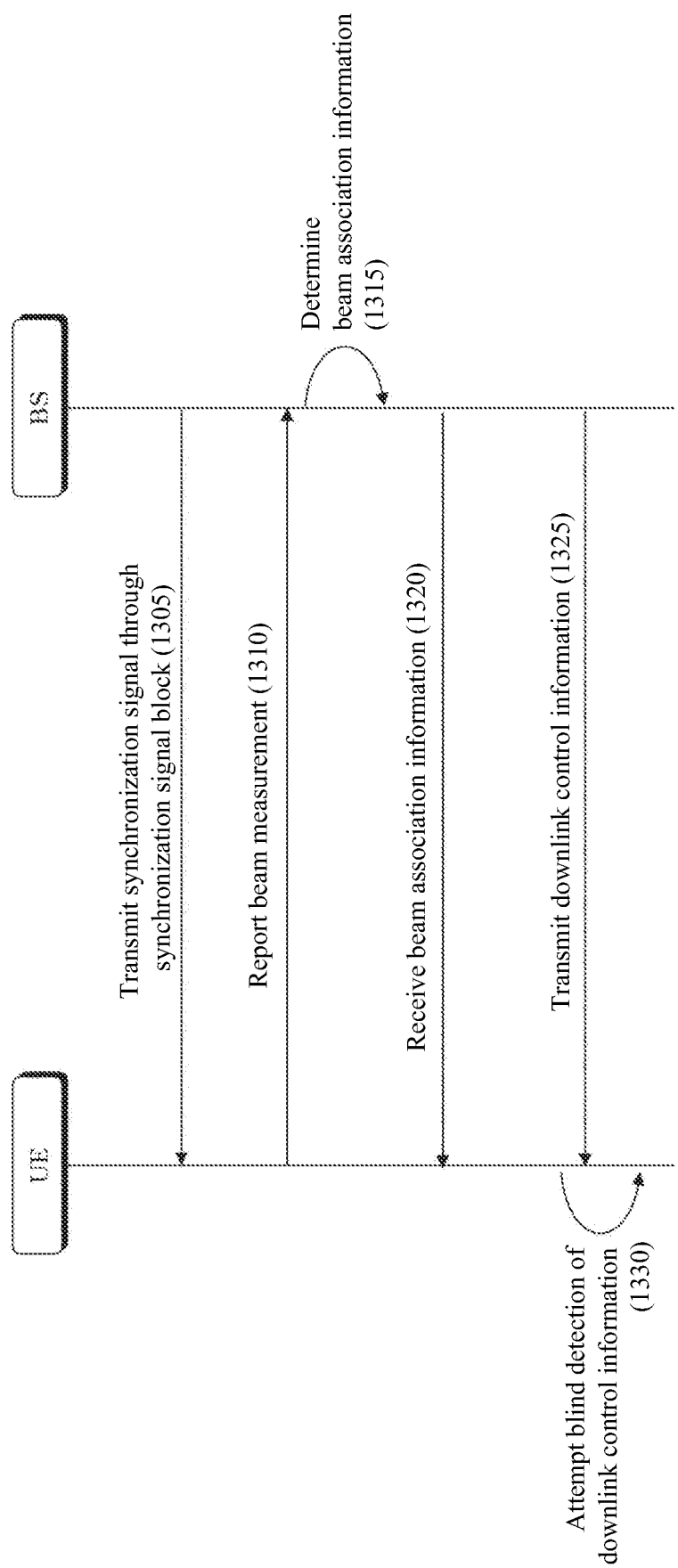
FIG. 13 illustrate an example of a method of transmitting and receiving downlink control information between a BS and a UE.

FIG. 13 is a flowchart illustrating a method of transmitting and receiving downlink control information between a BS and a UE according to an embodiment of the present invention. Redundant descriptions will be omitted herein.

Referring to FIG. 13, the UE receives a synchronization signal through a synchronization signal block from the BS [1305]. By receiving the synchronization signal, the UE may establish downlink synchronization with the BS. Additionally, a random-access procedure (not shown) may be performed for uplink synchronization.

The UE measures BS's multiple Transmission (Tx) beams using at least one Reception (Rx) beam and then report measurement results to the BS [1310].

The BS determines beam association information between UE's Rx beams and BS's Tx beams based on the UE's beam measurement report [1315]. The beam association information indicates at least two beam pairs, where the UE's Rx beam and the BS's Tx beams are associated with each other. The beam association information may include a beam index of one of Tx and Rx beams belonging to each beam pair or include indices of both the Tx and Rx beams.

The UE receives the beam association information from the BS [1320].

The BS transmits downlink control information based on the beam association information [1325], and the UE attempts blind detection of a physical downlink control channel carrying the downlink control information based on the beam association information [1330]. The UE may configure a Rx beam(s) to be used for the blind detection of the physical downlink control channel according to the two or more beams indicated by the beam association information. For example, the UE may attempt the blind detection of the physical downlink control channel by configuring different Rx beams for the at least two beam pairs, respectively.

The at least two beam pairs may be configured in different symbols within the same subframe, respectively.

The UE may receive, from the BS, information regarding at least one of control resource sets (CORESETs) where the at least two beam pairs are configured respectively and monitoring sets where the UE should monitor the at least two beam pairs respectively.

The UE may apply different Quasi Co-Location (QCL) assumptions to the CORESETs, respectively. For example, the UE may assume that the CORESETs are Quasi Co- Located (QCLed) with different Channel State Information-Reference Signals (CSI-RSs), respectively. As another example, the UE may assume that among the CORESETs, a first CORESET for UE-specific control information is QCLed with a CSI-RS and a second CORESET for common control information is QCLed with the synchronization signal block.

Figure 14:
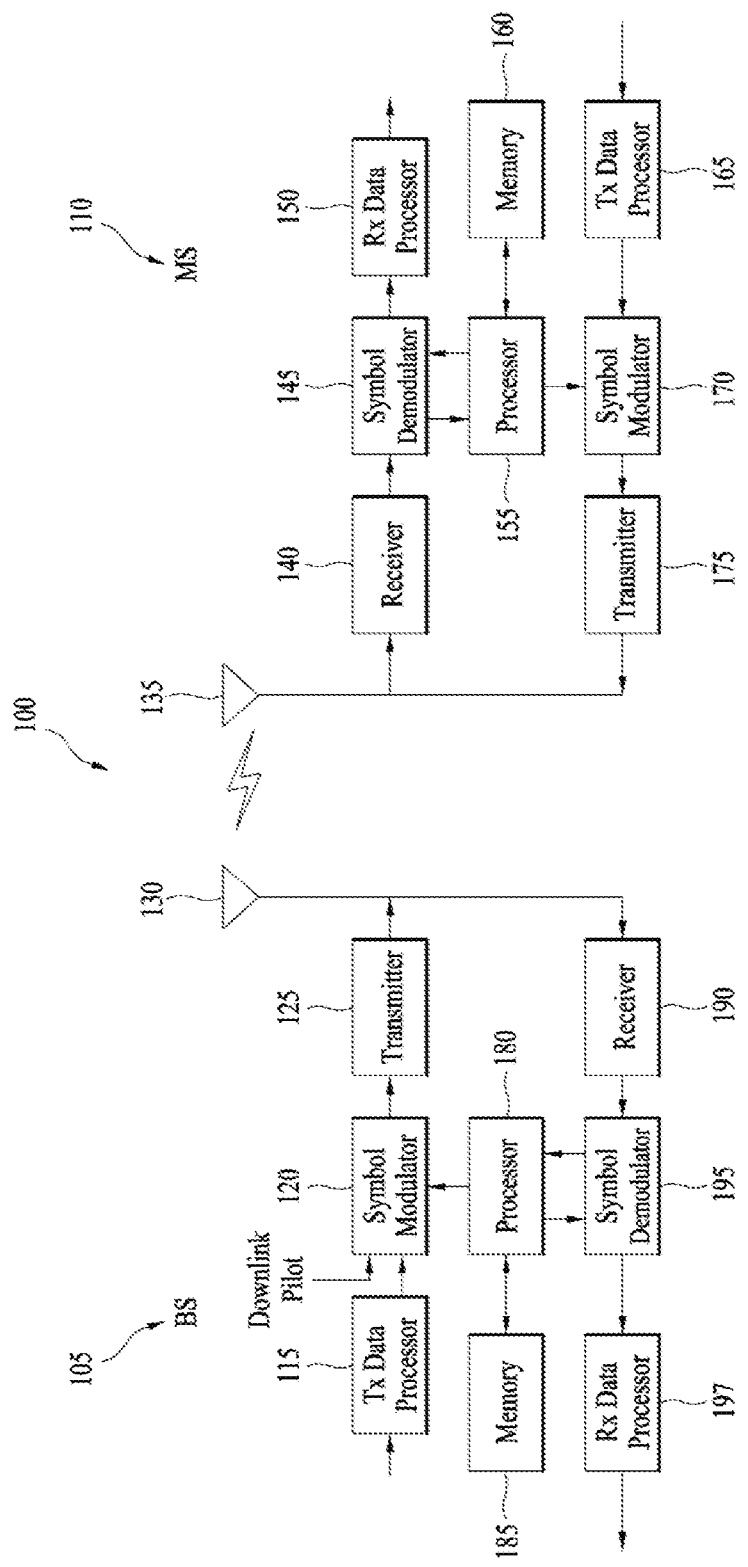
FIG. 14 illustrates a BS and a UE according to an embodiment of the present invention.

FIG. 14 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

A base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

What is claimed is:
1. A method of receiving downlink control information by a User Equipment (UE) in a wireless communication system, the method comprising:
receiving, from a Base Station (BS), beam association information between Reception (Rx) beams of the UE and Transmission (Tx) beams of the BS; and
attempting blind detection of a physical downlink control channel carrying the downlink control information based on the beam association information,
wherein the beam association information indicates at least two beam pairs where the Rx beams of the UE and the Tx beams of the BS are associated with each other,
wherein the UE configures an Rx beam to be used for the blind detection of the physical downlink control channel according to the at least two beam pairs indicated by the beam association information,
wherein the at least two beam pairs are configured in different symbols within a same subframe, respectively,
wherein the UE receives, from the BS, information regarding at least one of control resource sets (CORESETs) where the at least two beam pairs are configured respectively and monitoring sets where the UE should monitor the at least two beam pairs respectively,
wherein the UE applies different Quasi Co-Location (QCL) assumptions to the CORESETs, respectively, and
wherein the UE assumes that the CORESETs are Quasi Co-Located (QCLed) with different Channel State Information-Reference Signals (CSI-RSs), respectively.

2. The method of claim 1, wherein the beam association information includes a beam index of only one of Tx beam and Rx beam belonging to each beam pair or includes beam indices of both the Tx beam and the Rx beam.

3. The method of claim 1, further comprising:
reporting, to the BS, a result of measuring multiple Tx beams using at least one Rx beam, and
wherein the beam association information is obtained based on a measurement result report of the UE.

4. The method of claim 1, wherein the UE assumes that among the CORESETs, a first CORESET for UE-specific control information is QCLed with a CSI-RS and a second CORESET for common control information is QCLed with a synchronization signal block.

5. The method of claim 1, wherein the UE attempts the blind detection of the physical downlink control channel by configuring different Rx beams for the at least two beam pairs.

6. A method of transmitting downlink control information by a Base Station (BS) in a wireless communication system:
transmitting, to a User Equipment (UE), beam association information between Reception (Rx) beams of the UE and Transmission (Tx) beams of the BS; and
transmitting a physical downlink control channel carrying the downlink control information based on the beam association information
wherein the beam association information indicates at least two beam pairs where the Rx beams of the UE and the Tx beams of the BS are associated with each other,
wherein an Rx beam to be used for blind detection of the physical downlink control channel is configured according to the at least two beam pairs indicated by the beam association information,
wherein the at least two beam pairs are configured in different symbols within a same subframe, respectively, and
wherein the BS transmits, to the UE, information regarding at least one of control resource sets (CORESETs) where the at least two beam pairs are configured respectively and monitoring sets where the UE should monitor the at least two beam pairs respectively.

7. The method of claim 6, further comprising:
receiving, from the UE, a result of measuring multiple Tx beams using at least one Rx beam, and
wherein the beam association information is obtained based on a measurement result report of the UE.

8. The method of claim 6, wherein different Quasi Co-Location (QCL) assumptions are applied to the CORESETs, respectively.

9. A User Equipment (UE) for receiving downlink control information in a wireless communication system, the UE comprising:
a receiver; and
a processor configured to receive, from a Base Station (BS), beam association information between Reception (Rx) beams of the UE and Transmission (Tx) beams of the BS by controlling the receiver and to attempt blind detection of a physical downlink control channel carrying the downlink control information based on the beam association information,
wherein the beam association information indicates at least two beam pairs where the Rx beams of the UE and the Tx beams of the BS are associated with each other, wherein the processor is configured to configure an Rx beam to be used for the blind detection of the physical downlink control channel according to the at least two beam pairs indicated by the beam association information, wherein the at least two beam pairs are configured in different symbols within a same subframe, respectively, wherein the processor is configured to apply different Quasi Co-Location (QCL) assumptions to the CORESETs, respectively, and wherein the processor is configured to assume that the CORESETs are Quasi Co-Located (QCLed) with different Channel State Information-Reference Signals (CSI-RSs), respectively.

10. A Base Station (BS) for transmitting downlink control information in a wireless communication system, the BS comprising:

a transmitter; and a processor configured to transmit, to a User Equipment (UE), beam association information between Reception (Rx) beams of the UE and Transmission (Tx) beams of the BS by controlling the transmitter and transmit a physical downlink control channel carrying the downlink control information based on the beam association information, wherein the beam association information indicates at least two beam pairs where the Rx beams of the UE and the Tx beams of the BS are associated with each other, wherein an Rx beam to be used for blind detection of the physical downlink control channel is configured according to the at least two beam pairs indicated by the beam association information, and wherein the at least two beam pairs are configured in different symbols within a same subframe, respectively, and wherein the processor is configured to transmit, to the UE, information regarding at least one of control resource sets (CORESETs) where the at least two beam pairs are configured respectively and monitoring sets where the UE should monitor the at least two beam pairs respectively.

* * * * *